US010687218B2

(12) United States Patent
Yerramalli et al.

(10) Patent No.: US 10,687,218 B2
(45) Date of Patent: Jun. 16, 2020

(54) POWER METRIC OPTIMIZATION AND UPLINK DM-RS DESIGN FOR LTE/LTE-A UPLINK TRANSMISSIONS IN UNLICENSED SPECTRUM

(71) Applicant: QUALCOMM Incorporated, San Diego, CA (US)

(72) Inventors: Srinivas Yerramalli, San Diego, CA (US); Tao Luo, San Diego, CA (US); Durga Prasad Malladi, San Diego, CA (US); Naga Bhushan, San Diego, CA (US); Yongbin Wei, San Diego, CA (US); Peter Gaal, San Diego, CA (US); Wanshi Chen, San Diego, CA (US); Aleksandar Damnjanovic, Del Mar, CA (US); Tingfang Ji, San Diego, CA (US); Ravi Teja Sukhavasi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/532,266

(22) Filed: Nov. 4, 2014

(65) Prior Publication Data

US 2015/0156638 A1 Jun. 4, 2015

Related U.S. Application Data

(60) Provisional application No. 61/911,342, filed on Dec. 3, 2013.

(51) Int. Cl.
*H04W 16/14* (2009.01)
*H04L 5/00* (2006.01)

(52) U.S. Cl.
CPC ........... *H04W 16/14* (2013.01); *H04L 5/0041* (2013.01); *H04L 5/0051* (2013.01)

(58) Field of Classification Search
CPC ... H04W 16/14; H04W 76/023; H04W 88/06; H04W 76/14; H04L 5/001; H04L 5/0037; H04L 5/0041; H04L 5/0051
See application file for complete search history.

(56) References Cited

U.S. PATENT DOCUMENTS 7,903,628 B2 3/2011 Akkarakaran et al.
8,208,434 B2 6/2012 Sayana et al.
(Continued)

FOREIGN PATENT DOCUMENTS

JP 2010081349 A 4/2010
JP 2012506226 A 3/2012
(Continued)

OTHER PUBLICATIONS

Peter Rysavy, White Spaces Networks Are Not "super" nor even Wi-Fi, www.gigaom.com, Mar. 17, 2013, p. 12.*
(Continued)

*Primary Examiner* — George Eng
*Assistant Examiner* — Hung K Du
(74) *Attorney, Agent, or Firm* — Holland & Hart LLP

(57) ABSTRACT

Methods and apparatus for wireless communication are described. A method may include receiving at a user equipment (UE) a number of allocated interlaces for an uplink transmission over a shared spectrum, each of which may include a plurality of non-contiguous resource blocks (RB) of the shared spectrum. In some cases, the number of allocated interlaces is unsupported by joint interlace precoding hardware of the UE and the allocated interlaces may be partitioned into subsets of interlaces which may be a size supported by the joint interlace precoding hardware. Reference signals may be generated for the RBs of the allocated
(Continued)

interlaces according to a reference signal sequence based on an ordering of the RBs for the allocated interlaces within the shared spectrum.

35 Claims, 22 Drawing Sheets

(56) References Cited

U.S. PATENT DOCUMENTS

| | | |
|---|---|---|
| 2005/0135308 A1 | 6/2005 | Vijayan et al. |
| 2008/0080560 A1 | 4/2008 | Inoue et al. |
| 2011/0228748 A1 | 9/2011 | Han et al. |
| 2011/0249767 A1 | 10/2011 | Chen et al. |
| 2011/0255450 A1* | 10/2011 | Wang ............... H04W 72/0493 370/280 |
| 2011/0282989 A1* | 11/2011 | Geirhofer ............ H04L 67/104 709/224 |
| 2012/0026962 A1* | 2/2012 | Inoue ................ H04L 27/2613 370/329 |
| 2012/0207067 A1* | 8/2012 | Malladi ................ H04L 5/0007 370/281 |
| 2012/0282942 A1* | 11/2012 | Uusitalo ............... H04W 16/14 455/452.2 |
| 2013/0034007 A1 | 2/2013 | Zhang et al. |
| 2013/0034887 A1 | 2/2013 | Zhang et al. |
| 2013/0058234 A1 | 3/2013 | Yang et al. |
| 2013/0195052 A1 | 8/2013 | Ahmadi |
| 2014/0071931 A1* | 3/2014 | Lee ........................ H04L 5/001 370/329 |
| 2014/0321402 A1 | 10/2014 | Wang et al. |
| 2015/0280876 A1* | 10/2015 | You ....................... H04L 5/0048 370/329 |
| 2016/0183319 A1* | 6/2016 | Byun .................... H04W 76/14 370/329 |
| 2019/0090138 A1 | 3/2019 | Yerramalli et al. |

FOREIGN PATENT DOCUMENTS

| | | |
|---|---|---|
| WO | WO-2007024932 A1 | 3/2007 |
| WO | WO-2011005536 A1 | 1/2011 |
| WO | WO-2012157994 A3 | 3/2013 |

OTHER PUBLICATIONS

ISA/EPO, Partial International Search Report of the International Searching Authority, Int'l. App. No. PCT/US2014/064003, dated Jan. 20, 2015, European Patent Office, Rijswijk, NL, 4 pgs.

ISA/EPO, International Search Report and Written Opiniono of the International Searching Authority, Int'l. App. No. PCT/US2014/064003, dated Apr. 8, 2015, European Patent Office, Rijswijk, NL, 15 pgs.

Interdigital, "Analysis of Feedback Mechanisms for CoMP," 3GPP TSG RAN WG1 Meeting #57bis, Los Angeles, USA, Jun. 29-Jul. 3, 2009, R1-92585, pp. 1-10, 3rd Generation Partnership Project.

ITRI, "Preliminary Study on Codebook Design for JT-CoMP," 3GPP TSG RAN WG1 Meeting #66, Athens, Greece, Aug. 22-26, 2011, R1-112454, pp. 1-5, 3rd Generation Partnership Project.

* cited by examiner

POWER METRIC OPTIMIZATION AND UPLINK DM-RS DESIGN FOR LTE/LTE-A UPLINK TRANSMISSIONS IN UNLICENSED SPECTRUM

CROSS REFERENCES

The present application for patent claims priority to U.S. Provisional Patent Application No. 61/911,342 by Yerramalli et al., entitled "Power Metric Optimization And Uplink DM-RS Design For LTE/LTE-A Uplink Transmissions In Unlicensed Spectrum," filed Dec. 3, 2013, assigned to the assignee hereof, and expressly incorporated by reference herein.

BACKGROUND

Field of Disclosure

The following relates generally to wireless communication, and more specifically to power metric optimization and uplink demodulation reference signal (DM-RS) design.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream communication links.

The protocols or techniques used to transmit data or control signals (i.e., transmissions) over one or more communication links may have an impact on one or more power metrics (e.g., the peak-to-average power ratio (PAPR) or cubic metric (CM)) associated with the transmissions. For purposes such as power conservation and reliable transmissions, it may be desirable to transmit data or control signals using protocols or techniques that optimize these power metrics.

SUMMARY

The described features generally relate to methods and apparatus for wireless communication. The methods and apparatus may in some cases be used to optimize one or more power metrics (e.g., PAPR or CM) associated with uplink transmissions, such as LTE/LTE-A uplink transmissions in unlicensed spectrum. Some methods and apparatus may be more suited to optimizing one or more power metrics applicable to data signals, while other methods and apparatus may be more suited to optimizing one or more power metrics applicable to control signals (e.g., reference signals).

In some examples, a method for wireless communication includes receiving at a user equipment (UE) a number of allocated interlaces for an uplink transmission over a shared spectrum, wherein each allocated interlace includes a plurality of non-contiguous resource blocks of the shared spectrum, and generating reference signals for the resource blocks of the allocated interlaces according to a reference signal sequence based on an ordering of the resource blocks for the allocated interlaces within the shared spectrum.

In some examples, an apparatus for wireless communication includes a processor and memory coupled to the processor. The processor may be configured to receive at a user equipment (UE) a number of allocated interlaces for an uplink transmission over a shared spectrum, wherein each allocated interlace includes a plurality of non-contiguous resource blocks of the shared spectrum, and generate reference signals for the resource blocks of the allocated interlaces according to a reference signal sequence based on an ordering of the resource blocks for the allocated interlaces within the shared spectrum.

In some examples, a non-transitory computer-readable medium for storing instructions executable by a processor includes instructions to receive at a user equipment (UE) a number of allocated interlaces for an uplink transmission over a shared spectrum, wherein each allocated interlace includes a plurality of non-contiguous resource blocks of the shared spectrum, and instructions to generate reference signals for the resource blocks of the allocated interlaces according to a reference signal sequence based on an ordering of the resource blocks for the allocated interlaces within the shared spectrum.

In some examples, a method for wireless communication includes receiving at a user equipment (UE) a number of allocated interlaces for an uplink transmission over a shared spectrum, wherein each allocated interlace includes a plurality of non-contiguous resource blocks of the shared spectrum, and wherein the number of allocated interlaces is unsupported by joint interlace precoding hardware of the UE, partitioning the allocated interlaces into at least two subsets of interlaces, wherein a size of each subset of interlaces is supported by the joint interlace precoding hardware of the UE, and performing joint interlace precoding separately on each subset of interlaces at the UE.

Various examples of the above-described methods, devices, or non-transitory computer-readable medium may include the features of, means for, modules for, or processor-executable instructions for transmitting the uplink transmission over the shared spectrum, wherein the uplink transmission includes at least one of the allocated interlaces. Generating the reference signals may include mapping reference signal symbols from the reference signal sequence to the resource blocks of the allocated interlaces within the shared spectrum according to frequency, wherein a separate reference signal is generated for each of the resource blocks of the allocated interlaces based on the reference signal symbols mapped to that resource block. In some cases, the shared spectrum includes a plurality of resource blocks associated with at least one unallocated interlace, and generating the reference signals may include mapping reference signal symbols from the reference signal sequence to the resource blocks of the allocated interlace and the at least one unallocated interlace according to frequency, and puncturing the reference signal sequence to determine a subset of reference signal symbols mapped to the resource blocks of the allocated interlaces, wherein a separate reference signal is generated for each of the resource blocks of the allocated interlaces based on the reference signal symbols mapped to that resource block.

In some cases, generating the reference signals includes generating a number of computer generated sequences, and mapping one of the computer generated sequences to one of the resource blocks of the allocated interlaces within the shared spectrum. A length of the computer generated sequences may be based at least in part on a number of frequency subcarriers for the resource blocks. The number of computer generated sequences may be based at least in part on the number of allocated interlaces. In some cases, mapping one of the computer generated sequences to one of the resource blocks may include generating an outer sequence, determining a number of combined sequences, wherein the combined sequences are based at least in part on at least one of the computer generated sequences and the outer sequence, and mapping one of the combined sequences to one of the resource blocks of the allocated interlaces within the shared spectrum.

Various examples of the methods, devices, or non-transitory computer-readable medium may include the features of, means for, modules for, or processor-executable instructions for shifting at least one of the computer generated sequences based at least in part on a random cyclic shift.

Various examples of the methods, devices, or non-transitory computer-readable medium may include the features of, means for, modules for, or processor-executable instructions for selecting the size of each subset of interlaces based on a power metric associated with a combination of the selected sizes for the UE. In some cases, the number of allocated resources includes 7.

Various examples of the methods, devices, or non-transitory computer-readable medium may include the features of, means for, modules for, or processor-executable instructions for transmitting the subsets of interlaces over the shared spectrum to a base station. In some cases, the at least two subsets of interlaces include a first set of one interlace and a second set of six interlaces.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
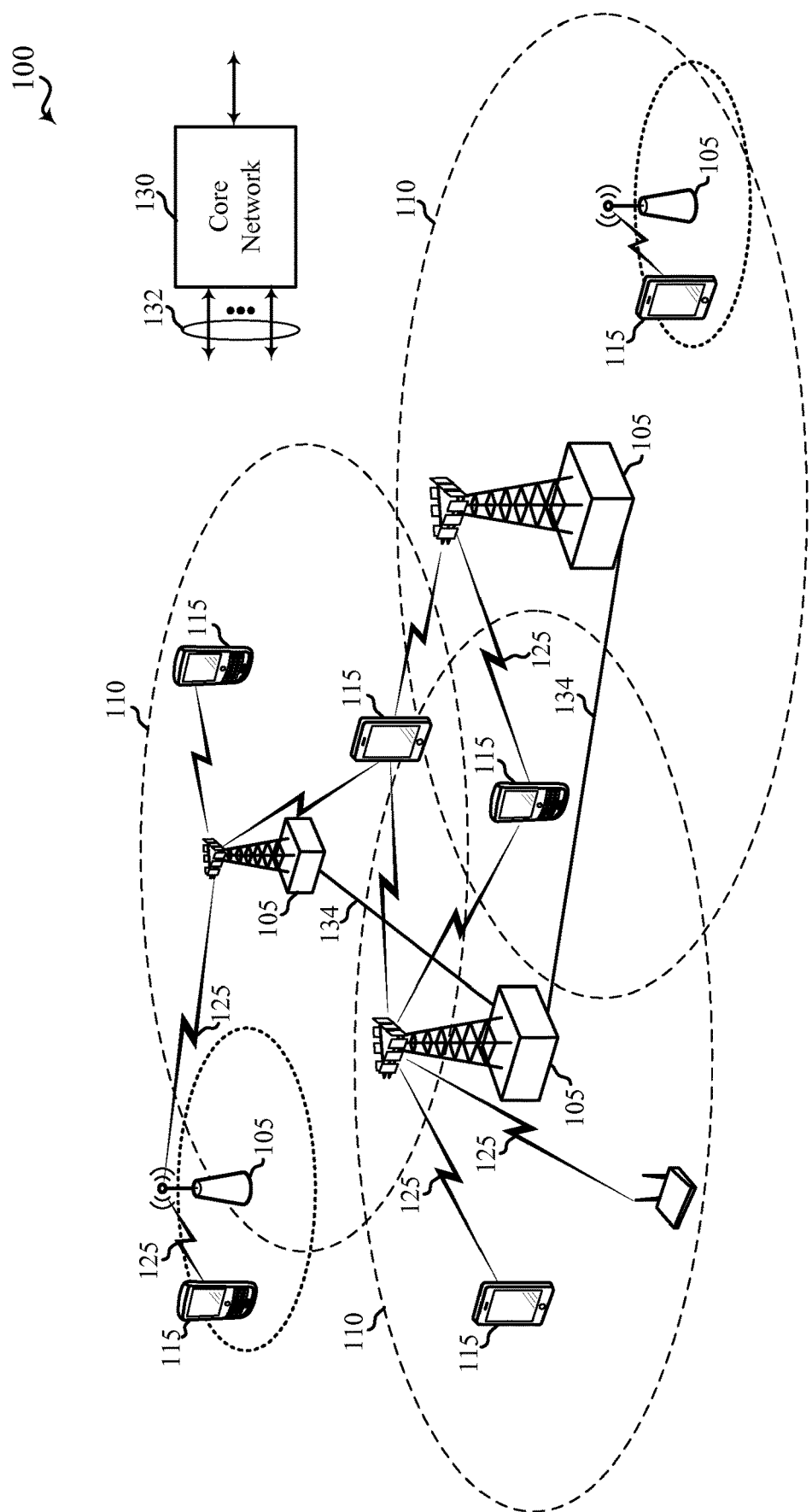
FIG. 1 shows a block diagram of a wireless communication system, in accordance with various aspects of the present disclosure.

When making 3GPP "Long Term Evolution" (LTE) or "LTE-Advanced" (LTE-A) uplink transmissions in unlicensed spectrum (e.g., a spectrum shared with apparatuses operating under LTE/LTE-A or other transmission protocols), it may be desirable to make an LTE/LTE-A uplink transmission in such a manner that it occupies at least eighty percent (80%) of the available bandwidth of the unlicensed spectrum. One way to achieve the 80% bandwidth occupancy requirement is to make an LTE/LTE-A uplink transmission across one or more interlaces. An interlace is defined herein as a plurality of non-contiguous resource blocks. The plurality of non-contiguous resource blocks may be selected in such a manner that the resource blocks span at least 80% of the available bandwidth of the unlicensed spectrum.

A problem that may be encountered when making an uplink transmission across one or more interlaces is poor power performance (e.g., high PAPR or high CM). The techniques disclosed herein therefore provide ways to reduce or optimize power metrics such as PAPR and CM when making LTE/LTE-A uplink transmissions in unlicensed spectrum. The techniques may be particularly applicable to SC-FDMA-based transmissions. The techniques may also be applied to LTE/LTE-A uplink transmissions in licensed spectrum, though such an application may not be backward compatible with existing LTE/LTE-A standards.

The techniques described herein are not limited to LTE/LTE-A, and may also be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communications system 100, in accordance with various aspects of the present disclosure. The wireless communications system 100 includes a plurality of base stations 105 (e.g., eNBs, WLAN access points, or other access points), a number of user equipments (UEs) 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more access point antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The wireless communications system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments. The coverage areas of different base stations 105, including the coverage areas of the same or different types of base stations 105, utilizing the same or different radio technologies, or belonging to the same or different access networks, may overlap.

In some examples, the wireless communications system 100 may include an LTE/LTE-A communications system (or network), which LTE/LTE-A communications system may support one or more modes of operation or deployment in unlicensed spectrum. In other examples, the wireless communications system 100 may support wireless communication using access technology different from LTE/LTE-A. In LTE/LTE-A communications systems, the term evolved NodeB or eNB may be generally used to describe the base stations 105.

The wireless communications system 100 may be a Heterogeneous LTE/LTE-A network in which different types of base stations 105 provide coverage for various geographical regions. For example, each base station 105 may provide communication coverage for a macro cell, a pico cell, a femto cell, or other types of cell. Small cells such as pico cells, femto cells, or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communications system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to a base station 105) or downlinks for carrying downlink (DL) transmissions (e.g., from a base station 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some examples of the wireless communications system 100, various deployment scenarios for LTE/LTE-A in unlicensed spectrum may be supported, including a supplemental downlink mode in which LTE/LTE-A downlink capacity in a licensed spectrum may be offloaded to an unlicensed spectrum, a carrier aggregation mode in which both LTE/LTE-A downlink and uplink capacity may be offloaded from a licensed spectrum to an unlicensed spectrum, and a stand-alone mode in which LTE/LTE-A downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE/LTE-A downlink transmissions in an unlicensed or a licensed spectrum, while SC-FDMA communications signals may be used in the communications links 125 for LTE/LTE-A uplink transmissions in an unlicensed or a licensed spectrum.

When a UE 115 is configured to transmit uplink communications over an unlicensed or shared spectrum, the UE may be allocated (e.g., by a base station 105) one or more interlaces of the unlicensed or shared spectrum for the uplink transmissions. Each of the interlaces may include multiple non-contiguous resource blocks of the unlicensed or shared spectrum. The UE 115 may generate reference signals (e.g., demodulation reference signals (DMRS)) for the resource blocks of the allocated interlaces according to a reference signal sequence. The reference signal sequence may be based on an ordering of the resource blocks for the allocated interlaces within the unlicensed or shared spectrum. By selecting the reference signal sequence on a per-resource block basis, the reference signals may improve per-resource block narrow band channel estimation by a base station 105, thereby resulting in an overall reduction of power and PAPR.

Figure 2A:
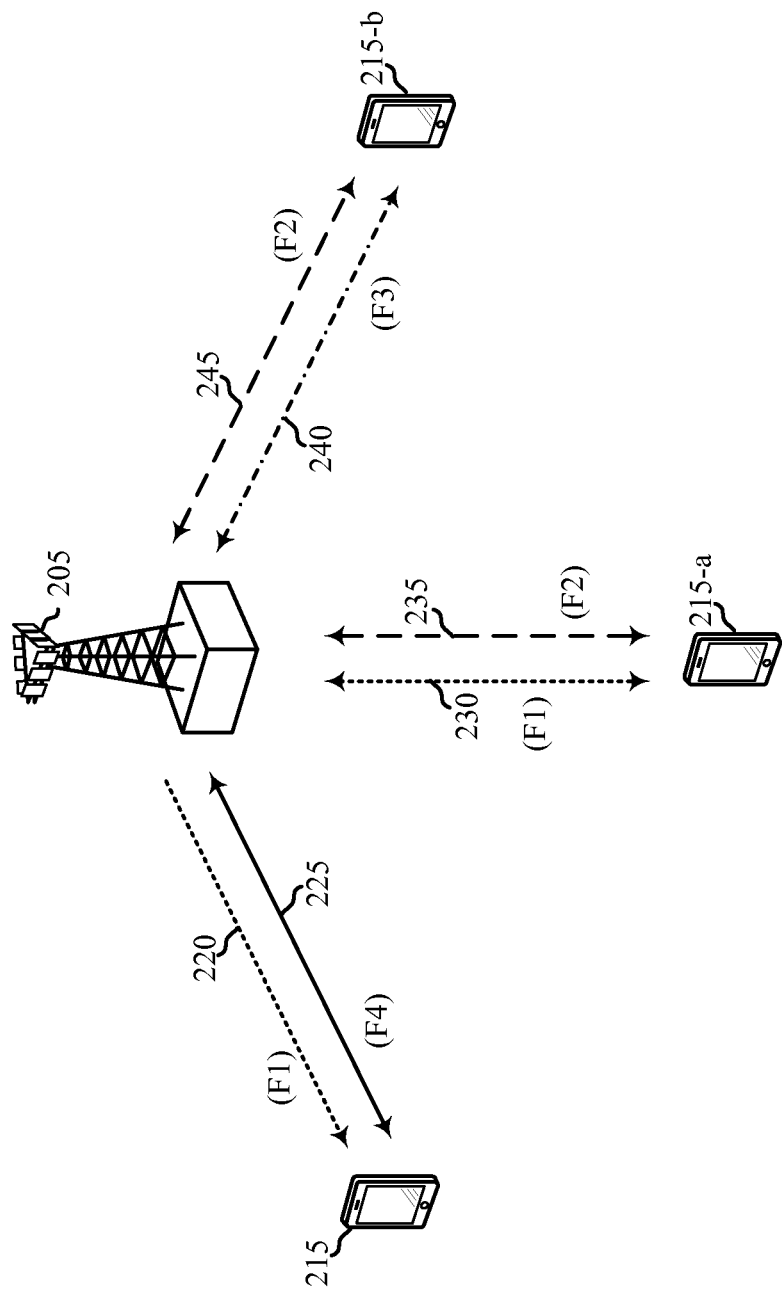
FIG. 2A shows a diagram that illustrates examples of deployment scenarios for using LTE/LTE-A in unlicensed spectrum, in accordance with various aspects of the present disclosure.

FIG. 2A shows a diagram that illustrates examples of deployment scenarios for using LTE in an unlicensed spectrum, in accordance with various aspects of the present disclosure. In one example, FIG. 2A illustrates a wireless communications system 200 illustrating examples of a supplemental downlink mode and a carrier aggregation mode for an LTE/LTE-A network that supports deployment in unlicensed spectrum. The wireless communications system 200 may be an example of portions of the wireless communications system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in the wireless communications system 200, the base station 205 may transmit OFDMA communications signals to a UE 215 using a downlink 220. The downlink 220 may be associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some examples, the downlink 220 may be used for unicast services (e.g., addressed to one UE) or for multicast services (e.g., addressed to several UEs). This scenario may occur with any service provider (e.g., traditional mobile network operator (MNO)) that uses a licensed spectrum and needs to relieve some of the traffic or signaling congestion.

In one example of a carrier aggregation mode in the wireless communications system 200, the base station 205 may transmit OFDMA communications signals to a UE 215-a using a bidirectional link 230 and may receive SC-FDMA communications signals from the same UE 215-a using the bidirectional link 230. The bidirectional link 230 may be associated with the frequency F1 in the unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic or signaling congestion.

In another example of a carrier aggregation mode in the wireless communications system 200, the base station 205 may transmit OFDMA communications signals to a UE 215-b using a bidirectional link 240 and may receive SC-FDMA communications signals from the same UE 215-b using the bidirectional link 240. The bidirectional link 240 may be associated with a frequency F3 in an unlicensed spectrum. The base station 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE/LTE-A in licensed and unlicensed spectrum for capacity offload.

As described above, the typical service provider that may benefit from the capacity offload offered by using LTE/LTE-A in unlicensed spectrum is a traditional MNO with LTE/LTE-A spectrum. For these service providers, an operational configuration may include a bootstrapped mode (e.g., supplemental downlink, carrier aggregation) that uses the LTE/LTE-A primary component carrier (PCC) on the licensed spectrum and a secondary component carrier (SCC) on the unlicensed spectrum.

In the carrier aggregation mode, data and control may generally be communicated in the licensed spectrum (e.g., bidirectional links 225, 235, and 245) while data may generally be communicated in the unlicensed spectrum (e.g., bidirectional links 230 and 240). The carrier aggregation mechanisms supported when using unlicensed spectrum may fall under a hybrid frequency division duplexing-time division duplexing (FDD-TDD) carrier aggregation or a TDD-TDD carrier aggregation with different symmetry across component carriers.

Figure 2B:
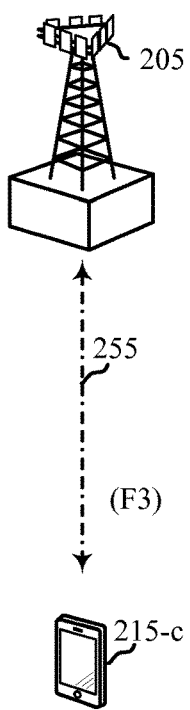
FIG. 2B shows a wireless communication system that illustrates an example of a standalone mode for LTE/LTE-A in unlicensed spectrum, in accordance with various aspects of the present disclosure.

FIG. 2B shows a wireless communication system 250 that illustrates an example of a standalone mode for LTE/LTE-A in unlicensed spectrum, in accordance with various aspects of the present disclosure. The wireless communication system 250 may be an example of portions of the wireless communications system 100 of FIG. 1 or 200 of FIG. 2A. Moreover, the base station 205 may be an example of the base stations 105 or 205 described with reference to FIG. 1 or 2A, while the UE 215-c may be an example of the UEs 115 or 215 of FIG. 1 or 2A.

In the example of a standalone mode in the wireless communication system 250, the base station 205 may transmit OFDMA communications signals to the UE 215-c using a bidirectional link 255 and may receive SC-FDMA communications signals from the UE 215-c using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have licensed spectrum.

In some examples, a transmitting device such as a base station 105, 205 (e.g., an eNB) described with reference to FIG. 1, 2A, or 2B, or a UE 115 or 215 described with reference to FIG. 1, 2A, or 2B, may use a gating interval to gain access to a channel of the shared spectrum (e.g., to a physical channel of the licensed or unlicensed spectrum). The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a Clear Channel Assessment (CCA). The outcome of the CCA may indicate to the transmitting device whether a channel of the shared unlicensed spectrum is available or in use. When the CCA indicates that the channel is available (e.g., "clear" for use), the gating interval may allow the transmitting device to use the channel—typically for a predefined transmission interval. When the CCA indicates that the channel is not available (e.g., in use or reserved), the gating interval may prevent the transmitting device from using the channel during the transmission interval.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in a shared spectrum, and to synchronize at least one boundary of the periodic gating interval with at least one boundary of a periodic frame structure (e.g., LTE/LTE-A radio frame) associated with the cellular downlink.

Figure 3:
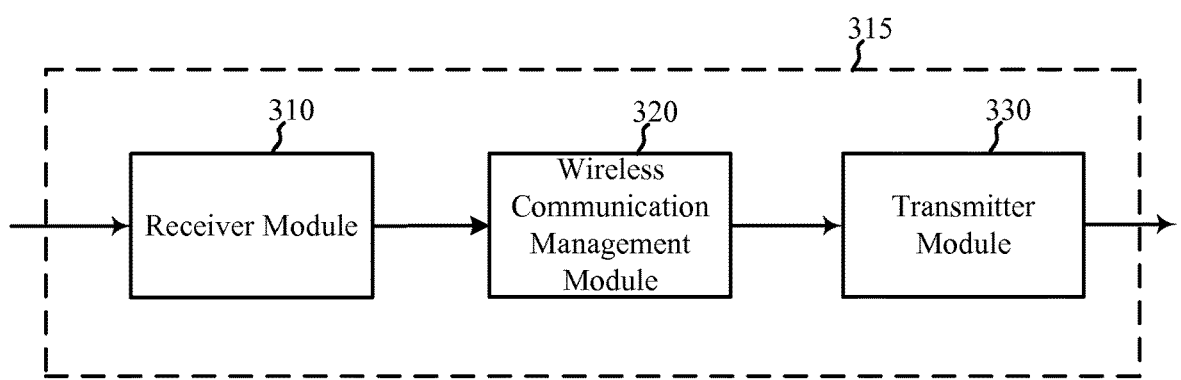
FIG. 3 shows a block diagram of an apparatus for use in wireless communication, in accordance with various aspects of the present disclosure.

FIG. 3 shows a block diagram 300 of an apparatus 315 for use in wireless communication, in accordance with various aspects of the present disclosure. In some examples, the apparatus 315 may be an example of one or more aspects of one of the UEs 115 or 215 described with reference to FIG. 1, 2A, or 2B. The apparatus 315 may also be a processor. The apparatus 315 may include a receiver module 310, a wireless communication management module 320, or a transmitter module 330. Each of these components may be in communication with each other.

The components of the apparatus 315 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 310 may be or include a radio frequency (RF) receiver, such as an RF receiver operable to receive transmissions in a first spectrum (e.g., an LTE/LTE-A licensed spectrum) or a second spectrum (e.g., an LTE/LTE-A unlicensed spectrum, which unlicensed spectrum may be shared with one or more apparatuses operating under the same or different transmission protocols, and which unlicensed spectrum may include WiFi spectrum). The receiver module 310 may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 330 may be or include an RF transmitter, such as an RF transmitter operable to transmit in the first spectrum or the second spectrum. The transmitter module 330 may be used to transmit various types of data or control signals (i.e., transmissions) over one or more communication links of the wireless communications system including the first spectrum and the second spectrum.

In some examples, the wireless communication management module 320 may manage the receipt of wireless communications via the receiver module 310 or the transmission of wireless communications via the transmitter module 330. On the transmission side, and by way of example, the wireless communication management module 320 may manage transmissions for the purpose of managing peak-to-average power ratio (PAPR), cubic metric (CM), or other power metrics pertaining to transmissions from the transmitter module 330. In some cases, the wireless communication management module 320 may select a permutation to apply to a stream of bits or modulation symbols, which permutation optimizes one or more power metrics associated with the stream. In other cases, the wireless communication management module 320 may manage the precoding of interlaces or select parameters used to transmit one or more reference symbols associated with a stream of bits or modulation symbols.

Figure 4:
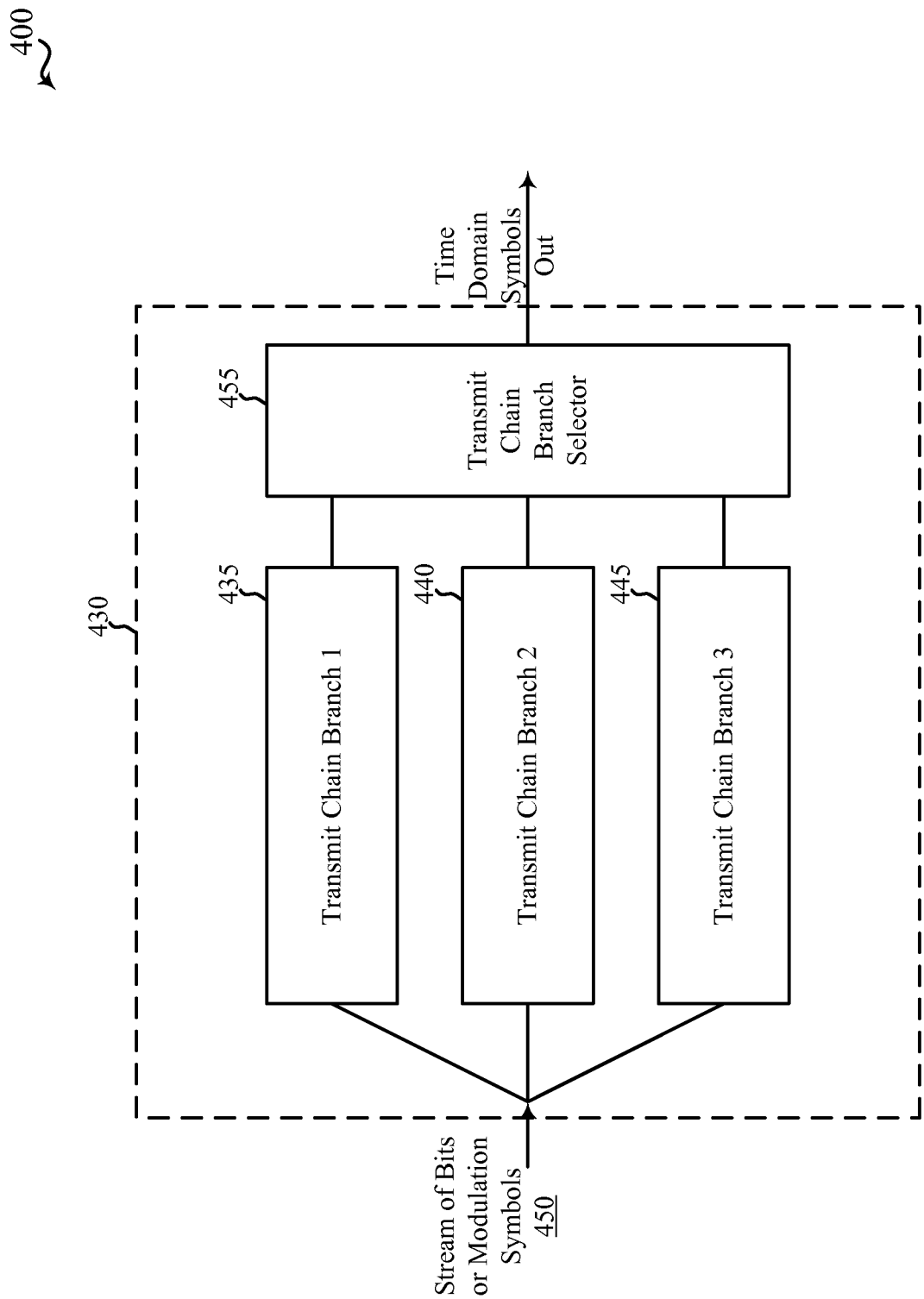
FIG. 4 shows a block diagram of a transmitter module for use in wireless communication, in accordance with various aspects of the present disclosure.

FIG. 4 shows a block diagram 400 of a transmitter module 430 for use in wireless communication, in accordance with various aspects of the present disclosure. In some examples, the transmitter module 430 may be an example of a transmitter module included in one or more of the UEs 115 or 215 described with reference to FIG. 1, 2A, or 2B. The transmitter module 430 may also be an example of one or more aspects of the transmitter module 330 described with reference to FIG. 3. The transmitter module 430 may include a plurality of (e.g., two or more) separate transmit chain branches 435, 440, or 445.

The components of the transmitter module 430 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the separate transmit chain branches 435, 440, 445 may each receive a stream of bits or modulation symbols 450 and have an end coupled to a transmit chain branch selector 455 that outputs a stream of bits or modulation symbols generated by a selected one of the separate transmit chain branches 535, 540, 545. In some cases, the transmit chain branch selector 455 may select one of the transmit chain branches 435, 440, 445 based on respective estimated power metrics of the transmit chain branches 435, 440, 445. For example, the transmit chain branch selector 455 may select one of the transmit chain branches 435, 440, 445 having a PAPR or CM that satisfies a threshold (e.g., is less than a threshold), or the transmit chain branch selector 455 may select one of the transmit chain branches 435, 440, 445 associated with a lowest PAPR or CM. The transmit chain branch selector 455 may in some cases be operated under control of the wireless communication management module 320 described with reference to FIG. 3.

In some examples, one of the transmit chain branches 435, 440, 445 may be selected for at least one of a slot, a subframe, or other block of bits or modulation symbols of the stream. In these examples, the respective estimated power metrics of the transmit chain branches 435, 440, 445 may include respective estimated power metrics across all bits or modulation symbols in the slot, subframe, or other block of bits or modulation symbols.

Figure 5:
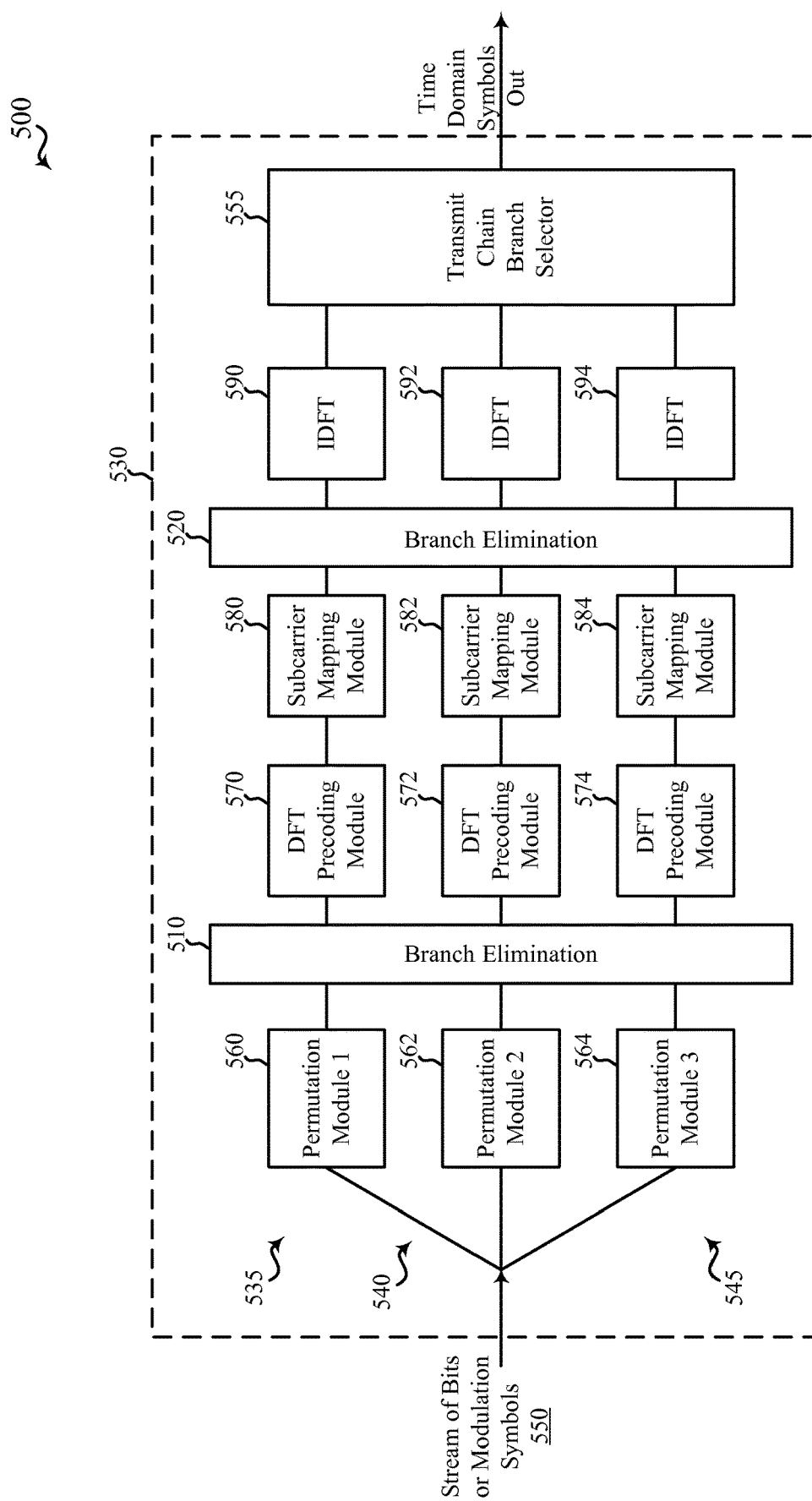
FIG. 5 shows a block diagram of a transmitter module for use in wireless communication, in accordance with various aspects of the present disclosure.

FIG. 5 shows a block diagram 500 of a transmitter module 530 for use in wireless communication, in accordance with various aspects of the present disclosure. In some examples, the transmitter module 530 may be an example of a transmitter module included in one or more of the UEs 115 or 215 described with reference to FIG. 1, 2A, or 2B. The transmitter module 530 may also be an example of one or more aspects of the transmitter module 330 or 430 described with reference to FIG. 3 or 4. The transmitter module 530 may include a plurality of (e.g., two or more) separate transmit chain branches 535, 540, or 545.

The components of the transmitter module 530 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the separate transmit chain branches 535, 540, 545 may each receive a stream of bits or modulation symbols 550, permute the stream of bits or modulation symbols 550 in one of a number of different ways at a respective permutation module 560, 562, or 564, and then process the permutated stream of bits or modulation symbols through a similar chain of processing modules including, for example, a respective Discrete Fourier Transform (DFT) precoding module 570, 572, or 574, a respective subcarrier mapping module 580, 582, or 584, or a respective Inverse DFT (IDFT) module 590, 592, or 594. The end of each of the separate transmit chain branches 535, 540, 545 may be coupled to a transmit chain branch selector 555 that outputs a stream of bits or modulation symbols generated by a selected one of the separate transmit chain branches 535, 540, 545. In some cases, the transmit chain branch selector 555 may select one of the transmit chain branches 535, 540, 545 based on respective estimated power metrics of the transmit chain branches 535, 540, 545. For example, the transmit chain branch selector 555 may select one of the transmit chain branches 535, 540, 545 having a PAPR or CM that satisfies a threshold (e.g., is less than a threshold), or the transmit chain branch selector 555 may select one of the transmit chain branches 535, 540, 545 associated with a lowest PAPR or CM. The transmit chain branch selector 555 may in some cases be operated under control of the wireless communication management module 320 described with reference to FIG. 3.

In some cases, the transmit chain branch selector 555 may select one of the transmit chain branches based on an estimated power metric of one of the transmit chain branches 535, 540, 545 (or an estimated power metric of one of the permutations processed by one of the transmit chain branches 535, 540, 545) satisfying a threshold. For example, the transmit chain branch selector 555 may serially or in parallel compare the estimated power metric of each transmit chain branch 535, 540, 545 to a threshold, and upon identifying an estimated power metric that satisfies a threshold, select the transmit chain branch 535, 540, or 545 that corresponds to the identified estimated power metric. The comparison(s) of other estimated power metrics to the threshold may in some cases be skipped or terminated upon identifying a first estimated power metric to satisfy the threshold.

In other cases, the transmit chain branch selector 555 may select one of the transmit chain branches based on a comparison of respective estimated power metrics of the transmit chain branches 535, 540, 545 (or a comparison of respective estimated power metrics of the permutations processed by the transmit chain branches 535, 540, 545) at ends of the separate transmit chain branches (e.g., to identify an optimal one of the estimated power metrics).

In other cases, the transmit chain branch selector 555 may select one of the transmit chain branches based on a comparison of respective estimated power metrics of the transmit chain branches 535, 540, 545 (or a comparison of respective estimated power metrics of the permutations processed by the transmit chain branches 535, 540, 545) at an intermediate point during the processing of the permutations at the separate transmit chain branches (e.g., to identify an optimal one of the estimated power metrics). By way of example, the transmitter module 530 includes two intermediate points, each of which is denoted by a branch elimination module 510 or 520. Upon selecting a transmit chain branch 535, 540, 545 or permutation at one of the intermediate points, processing of the non-selected permutations may be discontinued, while processing of the selected permutation may continue.

Figure 6:
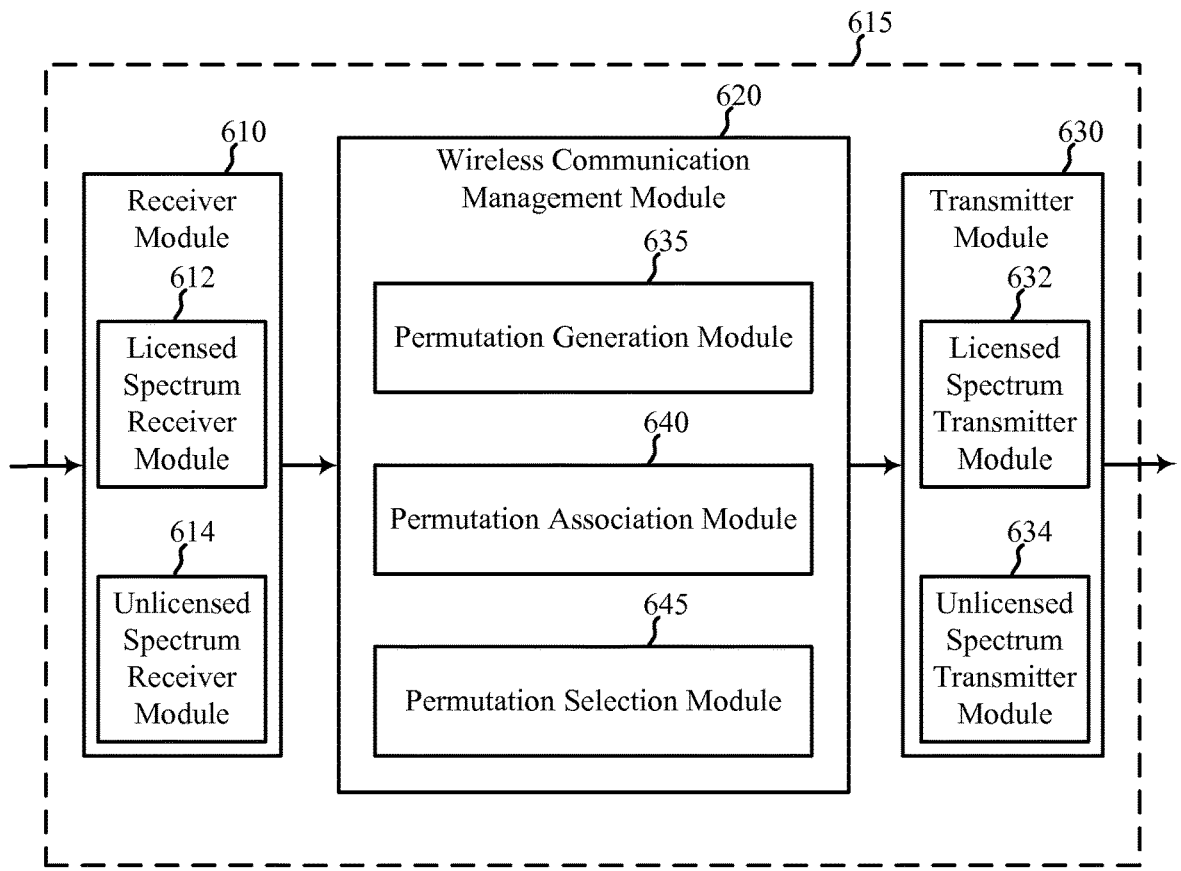
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. In some examples, the apparatus 615 may be an example of one or more aspects of one of the UEs 115 or 215 described with reference to FIG. 1, 2A, or 2B, or the apparatus 315 described with reference to FIG. 3. The apparatus 615 may also be a processor. The apparatus 615 may include a receiver module 610, a wireless communication management module 620, or a transmitter module 630. Each of these components may be in communication with each other.

The components of the apparatus 615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may be or include a radio frequency (RF) receiver, such as an RF receiver operable to receive transmissions in a first spectrum (e.g., an LTE/LTE-A licensed spectrum) or a second spectrum (e.g., an LTE/LTE-A unlicensed spectrum, which unlicensed spectrum may be shared with one or more apparatuses operating under the same or different transmission protocols, and which unlicensed spectrum may include WiFi spectrum). The RF receiver may include separate receivers for the first spectrum and the second spectrum. The separate receivers may in some cases take the form of a licensed spectrum receiver module 612 for communicating over the first spectrum, and an unlicensed spectrum receiver module 614 for communicating over the second spectrum. The receiver module 610, including the licensed spectrum receiver module 612 or the unlicensed spectrum receiver module 614, may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 630 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 632 for communicating over the first spectrum, and an unlicensed spectrum transmitter module 634 for communicating over the second spectrum. In some cases, the unlicensed spectrum transmitter module 634 may be configured similarly to the transmitter module 430 or 530 described with reference to FIG. 4 or 5. The transmitter module 630, including the licensed spectrum transmitter module 632 or the unlicensed spectrum transmitter module 634, may be used to transmit various types of data or control signals (i.e., transmissions) over one or more communication links of the wireless communications system including the first spectrum and the second spectrum.

In some examples, the wireless communication management module 620 may be an example of one or more aspects of the wireless communication management module 320 described with reference to FIG. 3 and may include a permutation generation module 635, a permutation association module 640, or a permutation selection module 645. Each of these components may be in communication with each other.

In some examples, the permutation generation module 635 may be used to receive a stream of bits or modulation symbols and generate a plurality of different permutations of the stream of bits or modulation symbols. The stream of bits or modulation symbols may in some cases be used for SC-FDMA-based transmissions on an LTE/LTE-A uplink channel in licensed or unlicensed spectrum.

In some examples, the permutation association module 640 may be used to associate each of the permutations generated by the permutation generation module 635 with a separate transmit chain branch of the unlicensed spectrum transmitter module 634.

In some examples, the permutation selection module 645 may be used to select one of the permutations for transmission from the unlicensed spectrum transmitter module 634. The one of the permutations may be selected based on respective estimated power metrics (e.g., PAPR or CM) of the permutations.

The permutation selection module 645 may in some cases select the one of the permutations for at least one of a slot, a subframe, or other block of bits or modulation symbols of the stream. In these cases, the respective estimated power metrics of the permutations may include respective estimated power metrics across all bits or modulation symbols in the slot, subframe, or other block of bits or modulation symbols.

Figure 7:
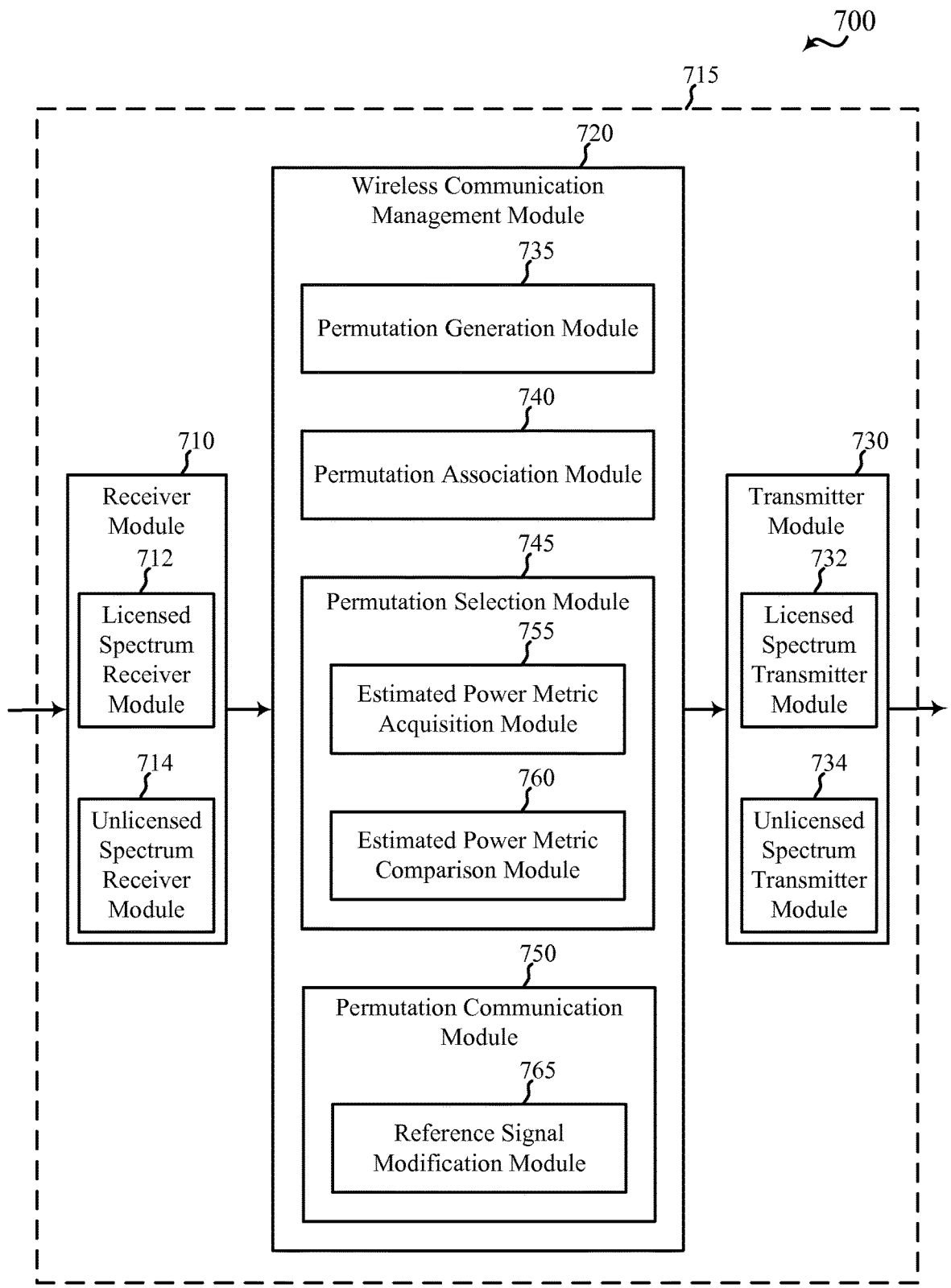
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. In some examples, the apparatus 715 may be an example of one or more aspects of one of the UEs 115 or 215 described with reference to FIG. 1, 2A, or 2B, or one of the apparatuses 315 or 615 described with reference to FIG. 3 or 6. The apparatus 715 may also be a processor. The apparatus 715 may include a receiver module 710, a wireless communication management module 720, or a transmitter module 730. Each of these components may be in communication with each other.

The components of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may be or include a radio frequency (RF) receiver, such as an RF receiver operable to receive transmissions in a first spectrum (e.g., an LTE/LTE-A licensed spectrum) or a second spectrum (e.g., an LTE/LTE-A unlicensed spectrum, which unlicensed spectrum may be shared with one or more apparatuses operating under the same or different transmission protocols, and which unlicensed spectrum may include WiFi spectrum). The RF receiver may include separate receivers for the first spectrum and the second spectrum. The separate receivers may in some cases take the form of a licensed spectrum receiver module 712 for communicating over the first spectrum, and an unlicensed spectrum receiver module 714 for communicating over the second spectrum. The receiver module 710, including the licensed spectrum receiver module 712 or the unlicensed spectrum receiver module 714, may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 730 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 732 for communicating over the first spectrum, and an unlicensed spectrum transmitter module 734 for communicating over the second spectrum. In some cases, the unlicensed spectrum transmitter module 734 may be configured similarly to the transmitter module 430 or 530 described with reference to FIG. 4 or 5. The transmitter module 730, including the licensed spectrum transmitter module 732 or the unlicensed spectrum transmitter module 734, may be used to transmit various types of data or control signals (i.e., transmissions) over one or more communication links of the wireless communications system including the first spectrum and the second spectrum.

In some examples, the wireless communication management module 720 may be an example of one or more aspects of the wireless communication management module 320 or 620 described with reference to FIG. 3 or 6 and may include a permutation generation module 735, a permutation association module 740, a permutation selection module 745, or a permutation communication module 750. Each of these components may be in communication with each other.

In some examples, the permutation generation module 735 may be used to receive a stream of bits or modulation symbols and generate a plurality of different permutations of the stream of bits or modulation symbols. The stream of bits or modulation symbols may in some cases be used for SC-FDMA-based transmissions on an LTE/LTE-A uplink channel in licensed or unlicensed spectrum.

The permutation generation module 735 may in some cases generate the plurality of different permutations of the stream by multiplying the stream by a multiplier derived from at least one pseudo-random sequence. The pseudo-random sequence may be known to both the apparatus 715 (or to the unlicensed spectrum transmitter module 734 of the apparatus 715) and to a receiver communicatively coupled to the apparatus 715 (or to the unlicensed spectrum transmitter module 734 of the apparatus 715).

In some examples, the permutation association module 740 may be used to associate each of the permutations generated by the permutation generation module 735 with a separate transmit chain branch of the unlicensed spectrum transmitter module 734. The permutations may then be processed at the separate transmit chain branches.

In some examples, the permutation selection module 745 may be used to select one of the permutations for transmission from the unlicensed spectrum transmitter module 734. The one of the permutations may be selected based on respective estimated power metrics (e.g., PAPR or CM) of the permutations. The permutation selection module 745 may in some cases include an estimated power metric acquisition module 755 or an estimated power metric comparison module 760. The estimated power metric acquisition module 755 may be used to acquire the respective estimated power metrics of the permutations (e.g., from the separate transmit chain branches of the unlicensed spectrum transmitter module 734). The respective estimated power metrics may be acquired at ends of the separate transmit chain branches of the unlicensed spectrum transmitter module 734 or at one or more intermediate points during the processing of the permutations at the separate transmit chain branches of the unlicensed spectrum transmitter module 734.

Upon the estimated power metric acquisition module 755 acquiring respective estimated power metrics for the permutations processed at the separate transmit chain branches of the unlicensed spectrum transmitter module 734, the estimated power metric comparison module 760 may compare each of the estimated power metrics to a threshold, to determine whether one or more of the estimated power metrics satisfies the threshold. For example, the estimated power metric comparison module 760 may serially or in parallel compare the estimated power metric of each permutation to a threshold, and upon identifying an estimated power metric that satisfies the threshold, the permutation selection module 745 may select that permutation that corresponds to the identified estimated power metric for transmission from the unlicensed spectrum transmitter module 734. The comparison(s) of other estimated power metrics to the threshold may in some cases be skipped or terminated upon identifying a first estimated power metric to satisfy the threshold. When the estimated power metrics are acquired at the ends of the separate transmit chain branches, and when none of the estimated power metrics satisfies the threshold, the permutation selection module 745 may select one of the permutations for transmission from the unlicensed spectrum transmitter module 734 based on an estimated power metric that comes closest to satisfying the comparison, or on some other basis (e.g., based on a default one of the permutations). When the respective estimated power metrics are acquired at an intermediate point during the processing of the permutations at the separate transmit chain branches, processing of the permutations other than the selected one of the permutations may be discontinued at the intermediate point. The discontinuation of processing of non-selected permutations may save power.

In another example, the estimated power metric comparison module 760 may compare the respective estimated power metrics to identify an optimal one of the estimated power metrics. When the respective estimated power metrics are acquired at the ends of the separate transmit chain branches, the permutation selection module 745 may select one of the permutations for transmission from the unlicensed spectrum transmitter module 734 based on the comparison. However, when the respective estimated power metrics are acquired at an intermediate point during the processing of the permutations at the separate transmit chain branches, the permutation selection module 745 may select one of the permutations for transmission only when the comparison made by the estimated power metric comparison module 760 is conclusive (e.g., when the estimated power metric also satisfies a threshold). When it is determined that the comparison is conclusive, processing of the permutations other than the selected one of the permutations may be discontinued at the intermediate point. The discontinuation of processing of non-selected permutations may save power. When it is determined that the comparison is inconclusive, it may be determined whether there exists an additional intermediate point at which respected estimated power metrics may be compared, or respective estimated power metrics may be compared at the ends of the separate transmit chain branches.

The permutation selection module 745 may in some cases select the one of the permutations for at least one of a slot, a subframe, or other block of bits or modulation symbols of the stream. In these cases, the respective estimated power metrics of the permutations may include respective estimated power metrics across all bits or modulation symbols in the slot, subframe, or other block of bits or modulation symbols.

In some examples, the permutation communication module 750 may be used to communicate, to a receiver, an indication of the permutation selected by the permutation selection module 745. In some cases, the permutation communication module 750 may communicate the indication of the selected permutation using a reference signal modification module 765. For example, the permutation communication module 750 may use the reference signal modification module 765 to modify a cyclic shift parameter of a reference signal for the stream. The cyclic shift parameter may be modified from an expected value such that the difference between the modified cyclic shift parameter and the expected value indicates the selected permutation. In some examples, the reference signal sequence for which the cyclic shift parameter is modified may be or include a DM-RS.

Figure 8:
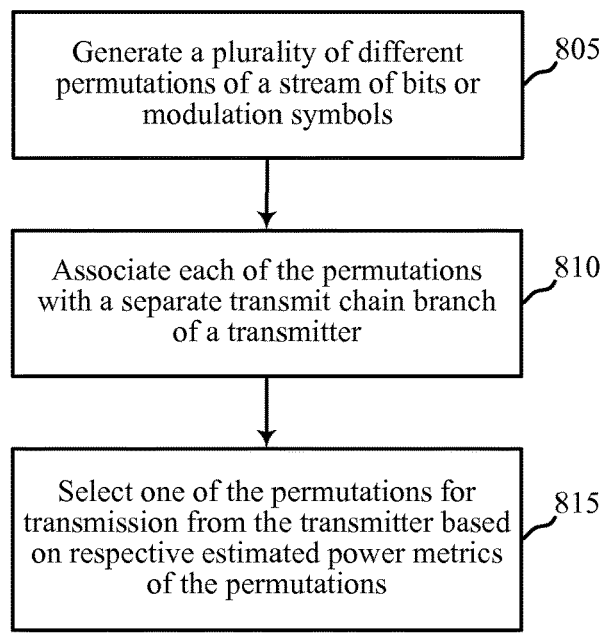
FIG. 8 is a flow chart illustrating an example of a method of wireless communication, in accordance with various aspects of the present disclosure.

FIG. 8 is a flow chart illustrating an example of a method 800 of wireless communication, in accordance with various aspects of the present disclosure. For clarity, the method 800 is described below with reference to aspects of one or more of the UEs 115 or 215 described with reference to FIG. 1, 2A, or 2B, or one of the apparatuses 315, 615, or 715 described with reference to FIG. 3, 6, or 7. In some examples, a UE such as one of the UEs 115 or 215 or an apparatus such as one of the apparatuses 315, 615, or 715 may execute one or more sets of codes to control the functional elements of the UE or apparatus to perform the functions described below.

At block 805, a plurality of different permutations of a stream of bits or modulation symbols may be generated. The stream of bits or modulation symbols may in some cases be used for SC-FDMA-based transmissions on an LTE/LTE-A uplink channel in licensed or unlicensed spectrum. The operation(s) at block 805 may be performed by the wireless communication management module 320, 620, or 720 described with reference to FIG. 3, 6, or 7, or the permutation generation module 635 or 735 described with reference to FIG. 6 or 7.

At block 810, each of the permutations generated at block 805 may be associated with a separate transmit chain branch of a transmitter. The operation(s) at block 810 may be performed by the wireless communication management module 320, 620, or 720 described with reference to FIG. 3, 6, or 7, or the permutation association module 640 or 740 described with reference to FIG. 6 or 7. The transmitter may in some cases be the transmitter module 330, 430, 530, 630, or 730 described with reference to FIG. 3, 4, 5, 6, or 7.

At block 815, one of the permutations may be selected for transmission from the transmitter based on respective estimated power metrics (e.g., PAPR or CM) of the permutations. The operation(s) at block 815 may be performed by the wireless communication management module 320, 620, or 720 described with reference to FIG. 3, 6, or 7, or the permutation selection module 645 or 745 described with reference to FIG. 6 or 7.

In some examples, the one of the permutations may be selected for at least one of a slot, a subframe, or other block of bits or modulation symbols of the stream. In these examples, the respective estimated power metrics of the permutations may include respective estimated power metrics across all bits or modulation symbols in the slot, subframe, or other block of bits or modulation symbols.

Thus, the method 800 may provide for wireless communication. It should be noted that the method 800 is just one implementation and that the operations of the method 800 may be rearranged or otherwise modified such that other implementations are possible.

Figure 9:
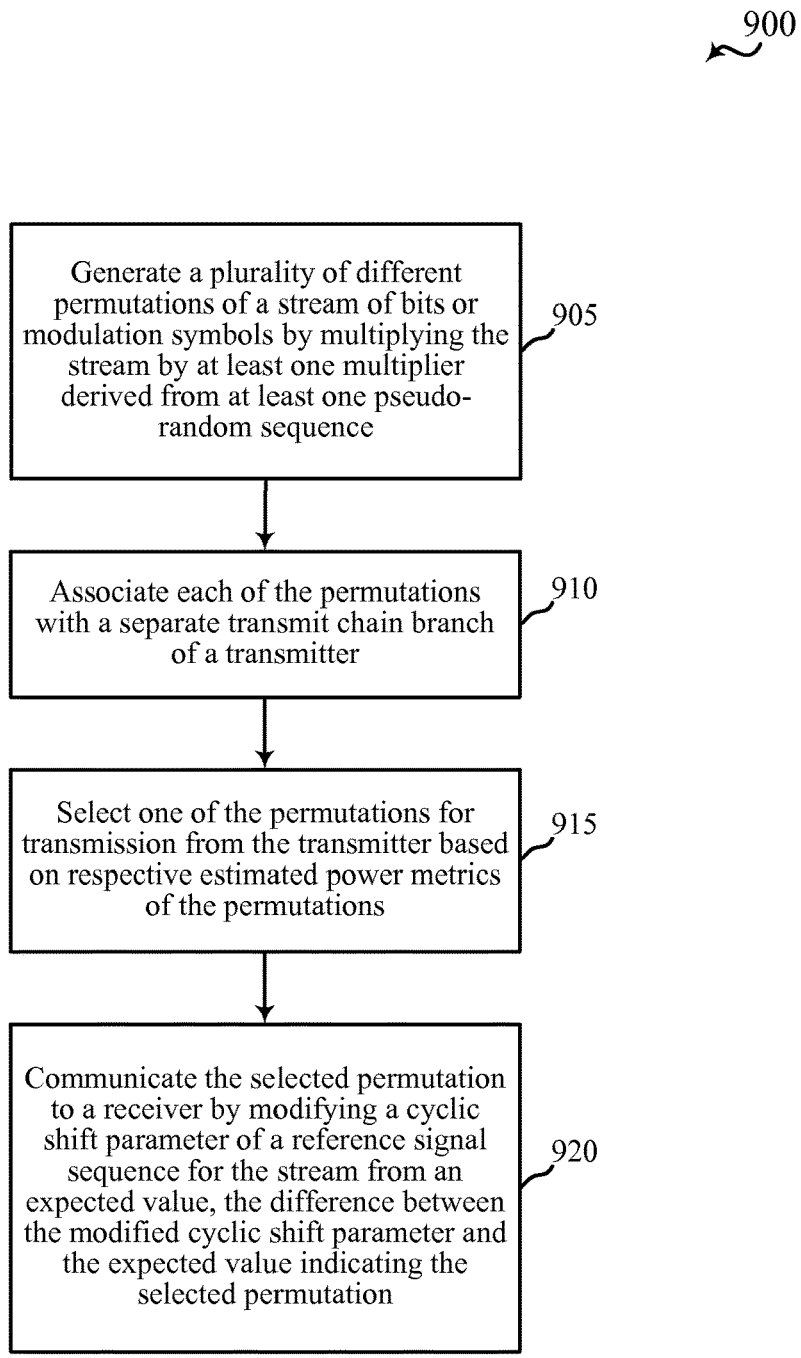
FIG. 9 is a flow chart illustrating an example of a method of wireless communication, in accordance with various aspects of the present disclosure.

FIG. 9 is a flow chart illustrating an example of a method 900 of wireless communication, in accordance with various aspects of the present disclosure. For clarity, the method 900 is described below with reference to aspects of one or more of the UEs 115 or 215 described with reference to FIG. 1, 2A, or 2B, or one of the apparatuses 315, 615, or 715 described with reference to FIG. 3, 6, or 7. In some examples, a UE such as one of the UEs 115 or 215 or an apparatus such as one of the apparatuses 315, 615, or 715 may execute one or more sets of codes to control the functional elements of the UE or apparatus to perform the functions described below.

At block 905, a plurality of different permutations of a stream of bits or modulation symbols may be generated, by multiplying the stream by a multiplier derived from at least one pseudo-random sequence. The stream of bits or modulation symbols may in some cases be used for SC-FDMA-based transmissions on an LTE/LTE-A uplink channel in licensed or unlicensed spectrum. The pseudo-random sequence may be known to both the transmitter and to a receiver communicatively coupled with the transmitter.

The operation(s) at block 905 may be performed by the wireless communication management module 320, 620, or 720 described with reference to FIG. 3, 6, or 7, or the permutation generation module 635 or 735 described with reference to FIG. 6 or 7. The transmitter may in some cases be the transmitter module 330, 430, 530, 630, or 730 described with reference to FIG. 3, 4, 5, 6, or 7.

At block 910, each of the permutations generated at block 905 may be associated with a separate transmit chain branch of a transmitter. The operation(s) at block 910 may be performed by the wireless communication management module 320, 620, or 720 described with reference to FIG. 3, 6, or 7, or the permutation association module 640 or 740 described with reference to FIG. 6 or 7.

At block 915, one of the permutations may be selected for transmission from the transmitter based on respective estimated power metrics (e.g., PAPR or CM) of the permutations. The operation(s) at block 915 may be performed by the wireless communication management module 320, 620, or 720 described with reference to FIG. 3, 6, or 7, or the permutation selection module 645 or 745 described with reference to FIG. 6 or 7.

In some examples, the one of the permutations may be selected for at least one of a slot, a subframe, or other block of bits or modulation symbols of the stream. In these examples, the respective estimated power metrics of the permutations may include respective estimated power metrics across all bits or modulation symbols in the slot, subframe, or other block of bits or modulation symbols.

At block 920, an indication of the selected permutation may be communicated to a receiver. The selected permutation may be communicated, in some examples, by modifying a cyclic shift parameter of a reference signal sequence for the stream. The cyclic shift parameter may be modified from an expected value such that the difference between the modified cyclic shift parameter and the expected value indicates the selected permutation. In some examples, the reference signal sequence for which the cyclic shift parameter is modified may be or include a DM-RS. The operation(s) at block 920 may be performed by the wireless communication management module 320, 620, or 720 described with reference to FIG. 3, 6, or 7, or the permutation communication module 750 or reference signal modification module 765 described with reference to FIG. 7.

Thus, the method 900 may provide for wireless communication. It should be noted that the method 900 is just one implementation and that the operations of the method 900 may be rearranged or otherwise modified such that other implementations are possible.

Figure 10:
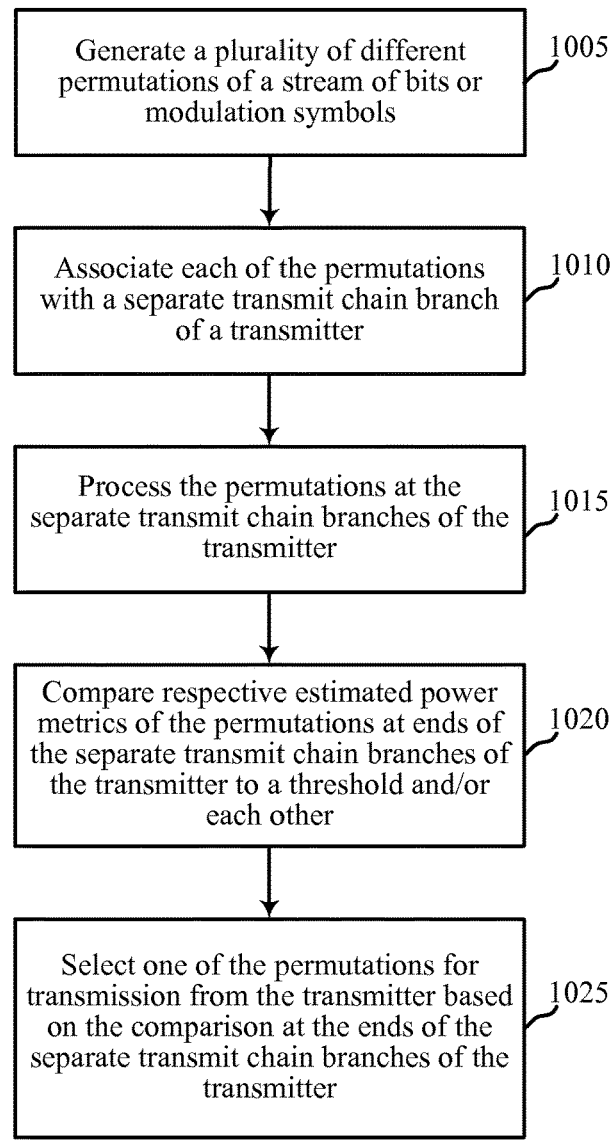
FIG. 10 is a flow chart illustrating an example of a method of wireless communication, in accordance with various aspects of the present disclosure.

FIG. 10 is a flow chart illustrating an example of a method 1000 of wireless communication, in accordance with various aspects of the present disclosure. For clarity, the method 1000 is described below with reference to aspects of one or more of the UEs 115 or 215 described with reference to FIG. 1, 2A, or 2B, or one of the apparatuses 315, 615, or 715 described with reference to FIG. 3, 6, or 7. In some examples, a UE such as one of the UEs 115 or 215 or an apparatus such as one of the apparatuses 315, 615, or 715 may execute one or more sets of codes to control the functional elements of the UE or apparatus to perform the functions described below.

At block 1005, a plurality of different permutations of a stream of bits or modulation symbols may be generated. The stream of bits or modulation symbols may in some cases be used for SC-FDMA-based transmissions on an LTE/LTE-A uplink channel in licensed or unlicensed spectrum. The operation(s) at block 1005 may be performed by the wireless communication management module 320, 620, or 720 described with reference to FIG. 3, 6, or 7, or the permutation generation module 635 or 735 described with reference to FIG. 6 or 7. The transmitter may in some cases be the transmitter module 330, 430, 530, 630, or 734 described with reference to FIG. 3, 4, 5, 6, or 7.

At block 1010, each of the permutations generated at block 805 may be associated with a separate transmit chain branch of a transmitter. The operation(s) at block 1010 may be performed by the wireless communication management module 320, 620, or 720 described with reference to FIG. 3, 6, or 7, or the permutation association module 640 or 740 described with reference to FIG. 6 or 7.

At block 1015, the permutations may be processed at the separate transmit chain branches of the transmitter. The operation(s) at block 1015 may be performed by the transmitter module 330, 430, 630, or 730 described with reference to FIG. 3, 4, 6, or 7, or the transmit chain branches 435, 440, or 445 or 535, 540, or 545 described with reference to FIG. 4 or 5.

At block 1020, respective estimated power metrics (e.g., PAPR or CM) of the permutations at ends of the separate transmit chain branches of the transmitter may be compared to a threshold or to each other (e.g., to identify one of the estimated power metrics that satisfies a threshold or to identify an optimal one of the estimated power metrics). The operation(s) at block 1020 may be performed by the wireless communication management module 320, 620, or 720 described with reference to FIG. 3, 6, or 7, the permutation selection module 645 or 745 described with reference to FIG. 6 or 7, or the estimated power metric acquisition module 755 or estimated power metric comparison module 760 described with reference to FIG. 7.

At block 1025, one of the permutations may be selected for transmission from the transmitter. The one of the permutations may be selected based on the comparison at block 1020. The operation(s) at block 1025 may be performed by the wireless communication management module 320, 620, or 720 described with reference to FIG. 3, 6, or 7, or the permutation selection module 645 or 745 described with reference to FIG. 6 or 7.

In some examples, the one of the permutations may be selected for at least one of a slot, a subframe, or other block of bits or modulation symbols of the stream. In these examples, the respective estimated power metrics of the permutations may include respective estimated power metrics across all bits or modulation symbols in the slot, subframe, or other block of bits or modulation symbols.

Thus, the method 1000 may provide for wireless communication. It should be noted that the method 1000 is just one implementation and that the operations of the method 1000 may be rearranged or otherwise modified such that other implementations are possible.

Figure 11:
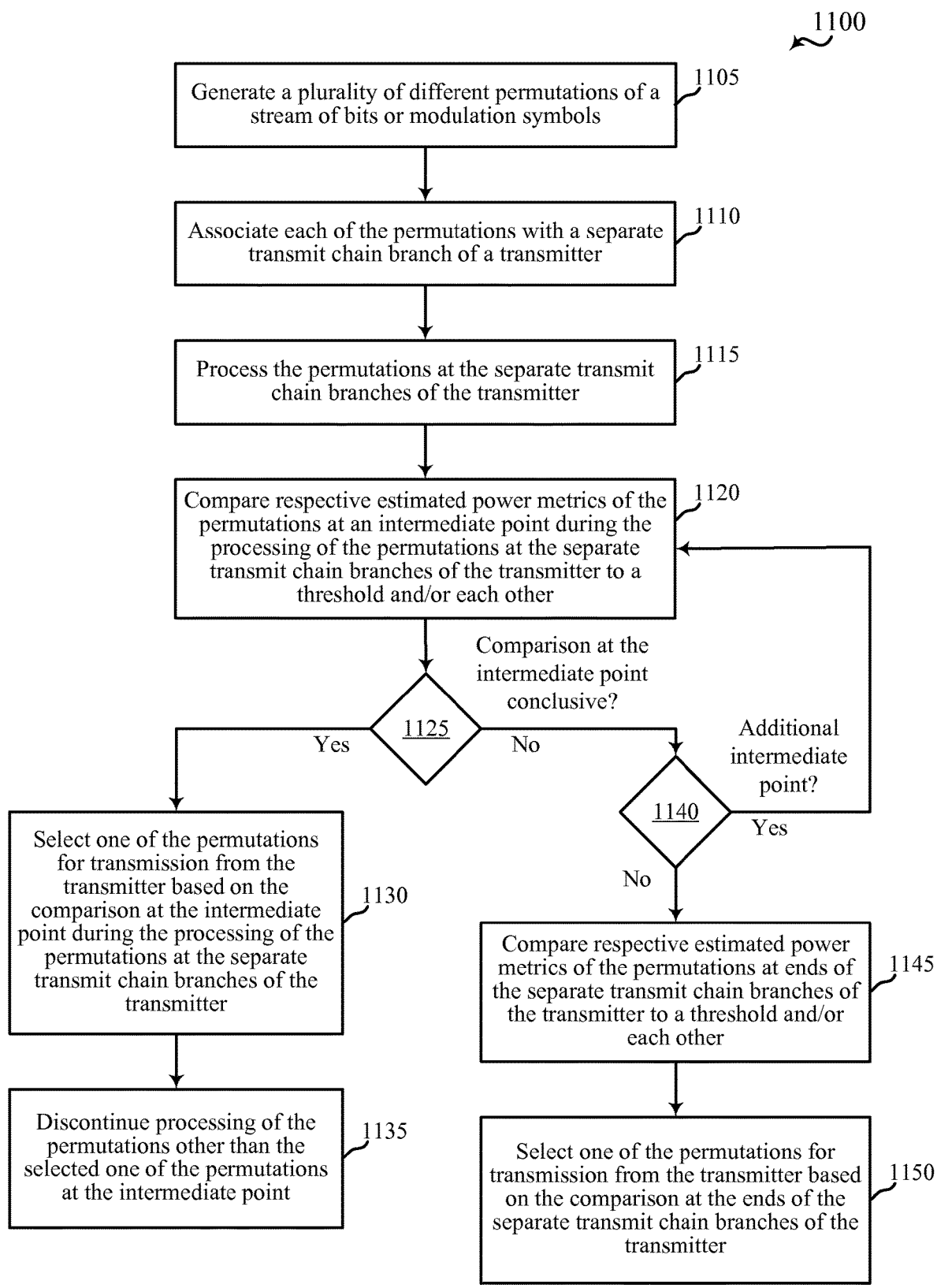
FIG. 11 is a flow chart illustrating an example of a method of wireless communication, in accordance with various aspects of the present disclosure.

FIG. 11 is a flow chart illustrating an example of a method 1100 of wireless communication, in accordance with various aspects of the present disclosure. For clarity, the method 1100 is described below with reference to aspects of one or more of the UEs 115 or 215 described with reference to FIG. 1, 2A, or 2B, or one of the apparatuses 315, 615, or 715 described with reference to FIG. 3, 6, or 7. In some examples, a UE such as one of the UEs 115 or 215 or an apparatus such as one of the apparatuses 315, 615, or 715 may execute one or more sets of codes to control the functional elements of the UE or apparatus to perform the functions described below.

At block 1105, a plurality of different permutations of a stream of bits or modulation symbols may be generated. The stream of bits or modulation symbols may in some cases be used for SC-FDMA-based transmissions on an LTE/LTE-A uplink channel in licensed or unlicensed spectrum. The operation(s) at block 1105 may be performed by the wireless communication management module 320, 620, or 720 described with reference to FIG. 3, 6, or 7, or the permutation generation module 635 or 735 described with reference to FIG. 6 or 7. The transmitter may in some cases be the transmitter module 330, 430, 530, 630, or 730 described with reference to FIG. 3, 4, 5, 6, or 7.

At block 1110, each of the permutations generated at block 805 may be associated with a separate transmit chain branch of a transmitter. The operation(s) at block 1110 may be performed by the wireless communication management module 320, 620, or 720 described with reference to FIG. 3, 6, or 7, or the permutation association module 640 or 740 described with reference to FIG. 6 or 7.

At block 1115, the permutations may be processed at the separate transmit chain branches of the transmitter. The operation(s) at block 1115 may be performed by the transmitter module 330, 430, 630, or 730 described with reference to FIG. 3, 4, 6, or 7, or the transmit chain branches 435, 440, or 445 or 535, 540, or 545 described with reference to FIG. 4 or 5.

At block 1120, respective estimated power metrics (e.g., PAPR or CM) of the permutations at an intermediate point during the processing of the permutations at the separate transmit chain branches of the transmitter may be compared to a threshold or to each other (e.g., to identify one of the estimated power metrics that satisfies a threshold or to identify an optimal one of the estimated power metrics). The operation(s) at block 1120 may be performed by the wireless communication management module 320, 620, or 720 described with reference to FIG. 3, 6, or 7, the permutation selection module 645 or 745 described with reference to FIG. 6 or 7, or the estimated power metric acquisition module 755 or estimated power metric comparison module 760 described with reference to FIG. 7.

At block 1125, it may be determined whether the comparison of the respective estimated power metrics of the permutations at the intermediate point is conclusive (e.g., when the estimated power metric also satisfies a threshold). When it is determined that the comparison is conclusive, one of the permutations may be selected at block 1130 for transmission from the transmitter. The one of the permutations may be selected based on the comparison(s) at block 1120.

At block 1135, and in response to the determination that the comparison at the intermediate point is conclusive, processing of the permutations other than the selected one of the permutations may be discontinued at the intermediate point. The discontinuation of processing of non-selected permutations may save power.

The operation(s) at block 1125, 1130, or 1135 may be performed by the wireless communication management module 320, 620, or 720 described with reference to FIG. 3, 6, or 7, or the permutation selection module 645 or 745 described with reference to FIG. 6 or 7.

At block 1140, and when it is determined at block 1125 that the comparison made at block 1120 is inconclusive, it may be determined whether there exists an additional intermediate point (e.g., an additional intermediate point during the processing of the permutations at the separate transmit chain branches of the transmitter) at which respective estimated power metrics of the permutations may be compared to a threshold or to each other. When an additional intermediate point exists, the flow of the method 1100 may return to block 1120, where the respective estimated power metrics of the permutations may be compared to a threshold or to each other at the additional intermediate point. Otherwise, the method 1100 may continue to block 1145.

At block 1145, respective estimated power metrics of the permutations at ends of the separate transmit chain branches of the transmitter may be compared to a threshold or each other (e.g., to identify one of the estimated power metrics that satisfies a threshold or to identify an optimal one of the estimated power metrics). The operation(s) at block 1145 may be performed by the wireless communication management module 320, 620, or 720 described with reference to FIG. 3, 6, or 7, the permutation selection module 645 or 745 described with reference to FIG. 6 or 7, or the estimated power metric acquisition module 755 or estimated power metric comparison module 760 described with reference to FIG. 7.

At block 1150, one of the permutations may be selected for transmission from the transmitter. The one of the permutations may be selected based on the comparison(s) at block 1145. The operation(s) at block 1150 may be performed by the wireless communication management module 320, 620, or 720 described with reference to FIG. 3, 6, or 7, or the permutation selection module 645 or 745 described with reference to FIG. 6 or 7.

In some examples, the one of the permutations selected at block 1130 or block 1150 may be selected for at least one of a slot, a subframe, or other block of bits or modulation symbols of the stream. In these examples, the respective estimated power metrics of the permutations may include respective estimated power metrics across all bits or modulation symbols in the slot, subframe, or other block of bits or modulation symbols.

Thus, the method 1100 may provide for wireless communication. It should be noted that the method 1100 is just one implementation and that the operations of the method 1100 may be rearranged or otherwise modified such that other implementations are possible.

In some cases, one or more aspects of the methods 800, 900, 1000, or 1100 may be combined.

Figure 12:
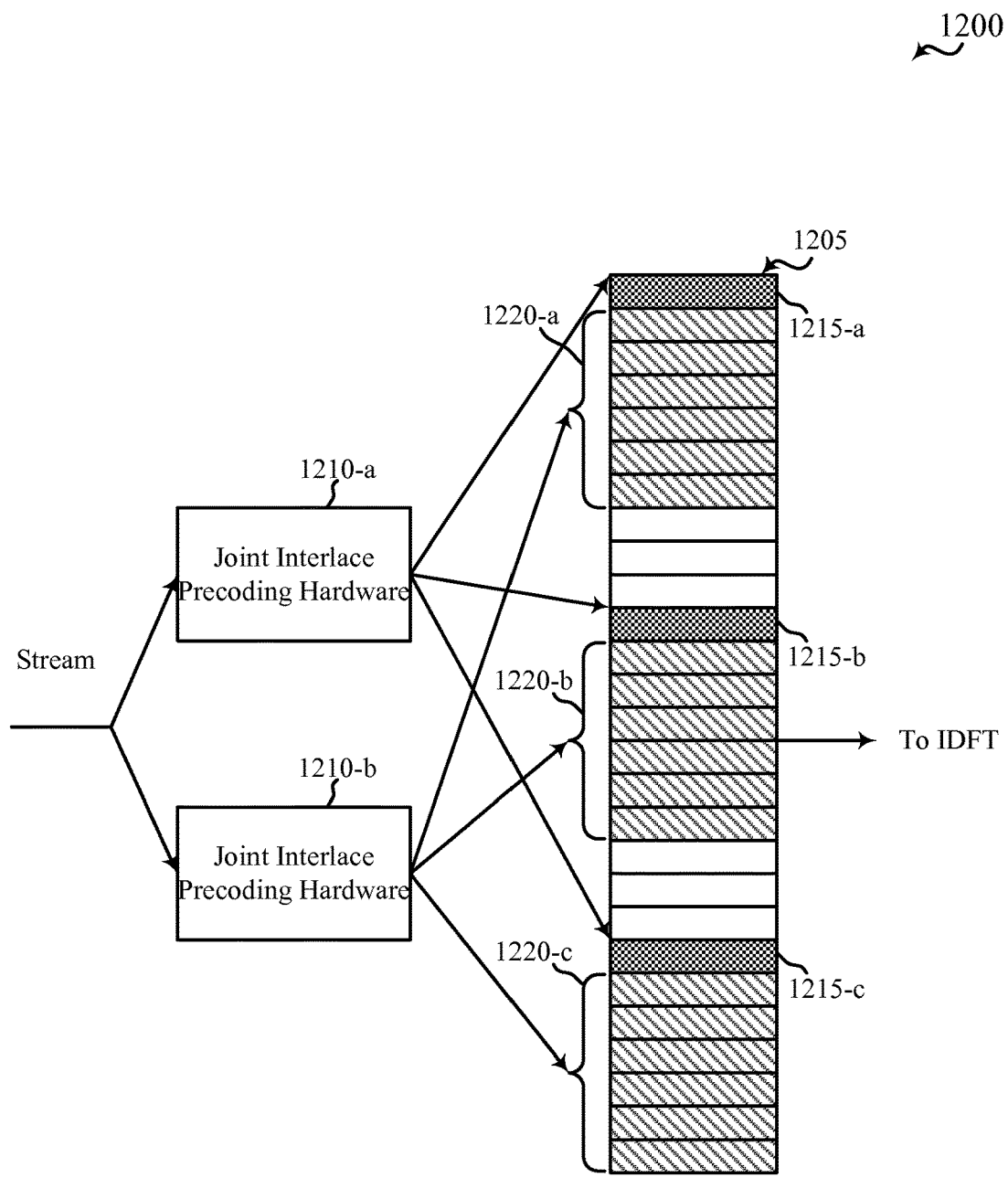
FIG. 12 illustrates an example of how allocated interlaces may be partitioned for the purpose of performing joint interlace precoding using joint interlace precoding hardware configured for LTE/LTE-A communications, in accordance with various aspects of the present disclosure.

FIG. 12 illustrates an example 1200 of how allocated interlaces 1205 may be partitioned for the purpose of performing joint interlace precoding using joint precoding hardware 1210 configured for LTE/LTE-A communications, in accordance with various aspects of the present disclosure.

Current LTE/LTE-A standards mandate that resource blocks be allocated to UEs in multiples of 2, 3, or 5 RBs. As a result, currently available joint precoding hardware 1210 may only be able to precode (e.g., DFT precode) groups of 2, 3, or 5 RBs. However, when making use of RB interleaved uplink transmissions, situations may arise where a number of interlaces that is not a multiple of 2, 3, or 5 RBs (e.g., 7 interlaces) is allocated to a particular UE. Joint interlace precoding hardware capable of precoding 2, 3, 5, or some other number of RBs (e.g., 7 RBs) may therefore need to be designed. Alternately, when an unsupported number of interlaces is allocated to a UE, the allocated interlaces may be partitioned into at least two subsets of interlaces 1215, 1220 (e.g., a subset of interlaces 1215 including one interlace (e.g., RBs 1215-*a*, 1215-*b*, and 1215-*c*), and a subset of interlaces 1220 including six interlaces (e.g., groups of RBs 1220-*a*, 1220-*b*, and 1220-*c*)), where a size of each subset of interlaces 1215, 1220 is supported by existing joint precoding hardware 1210. Joint precoding may then be performed (e.g., for a stream of bits or modulation symbols) on each subset of interlaces 1215, 1220 separately. Thus, for example, an allocation of seven interlaces, each having ten RBs, may be partitioned into a ratio of 10:60, 20:50, or 30:40 RBs. In some cases, the size of each subset of interlaces may be selected based on a power metric associated with a combination of the selected sizes. For example, a partitioning that optimizes a power metric (e.g., reduces PAPR or CM) for the combination of the selected sizes may be selected.

In some examples, each of the at least two subsets of interlaces 1215, 1220 may be separately processed by the same joint precoding hardware 1210, in which case blocks 1210-*a* and 1210-*b* may represent the same joint precoding hardware 1210 at different points in time. In other examples, each of the at least two subsets of interlaces 1215, 1220 may be separately processed by different joint precoding hardware 1210, in which case the blocks 1210-*a* and 1210-*b* may represent the different joint precoding hardware. An output of the joint interlace precoding may be provided to a downstream processing module, such as an IDFT module.

Figure 13:
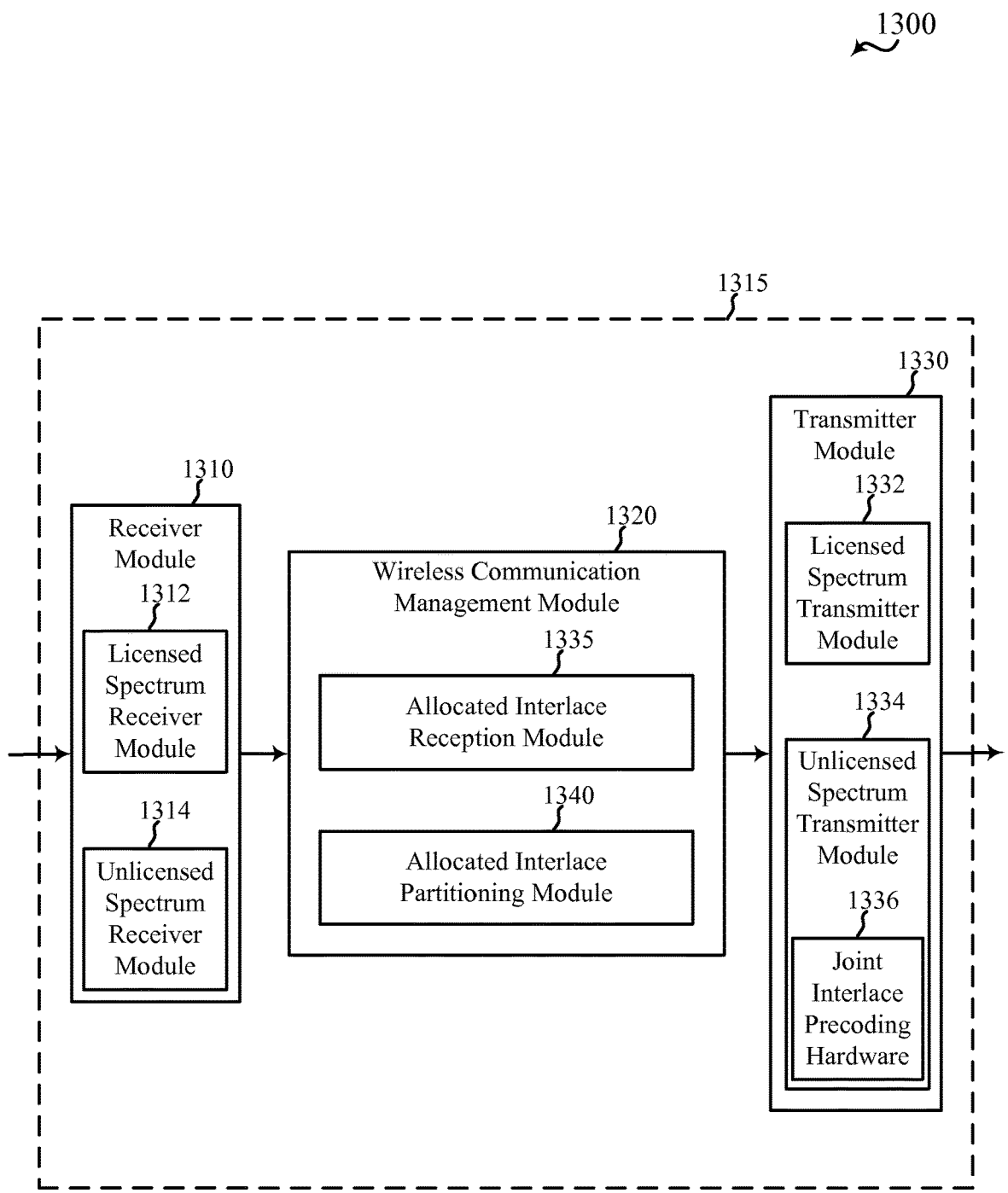
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. In some examples, the apparatus 1315 may be an example of one or more aspects of one of the UEs 115 or 215 described with reference to FIG. 1, 2A, or 2B, or the apparatus 315, 615, or 715 described with reference to FIG. 3, 6, or 7. The apparatus 1315 may also be a processor. The apparatus 1315 may include a receiver module 1310, a wireless communication management module 1320, or a transmitter module 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be or include a radio frequency (RF) receiver, such as an RF receiver operable to receive transmissions in a first spectrum (e.g., an LTE/LTE-A licensed spectrum) or a second spectrum (e.g., an LTE/LTE-A unlicensed spectrum, which unlicensed spectrum may be shared with one or more apparatuses operating under the same or different transmission protocols, and which unlicensed spectrum may include WiFi spectrum). The RF receiver may include separate receivers for the first spectrum and the second spectrum. The separate receivers may in some cases take the form of a licensed spectrum receiver module 1312 for communicating over the first spectrum, and an unlicensed spectrum receiver module 1314 for communicating over the second spectrum. The receiver module 1310, including the licensed spectrum receiver module 1312 or the unlicensed spectrum receiver module 1314, may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 1330 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1332 for communicating over the first spectrum, and an unlicensed spectrum transmitter module 1334 for communicating over the second spectrum. The transmitter module 1330, including the licensed spectrum transmitter module 1332 or the unlicensed spectrum transmitter module 1334, may be used to transmit various types of data or control signals (i.e., transmissions) over one or more communication links of the wireless communications system including the first spectrum and the second spectrum. In some cases, the unlicensed spectrum transmitter module 1334 may include joint interlace precoding hardware 1336, such as the joint precoding hardware 1210 described with reference to FIG. 12.

In some examples, the wireless communication management module 1320 may be an example of one or more aspects of the wireless communication management module 320, 620, or 720 described with reference to FIG. 3, 6, or 7 and may include an allocated interlace reception module 1335 or an allocated interlace partitioning module 1340. Each of these components may be in communication with each other.

In some examples, the allocated interlace reception module 1335 may be used to receive a number of allocated interlaces for an uplink transmission over a shared spectrum (e.g., an unlicensed spectrum in which LTE/LTE-A communications may be transmitted using the unlicensed spectrum transmitter module 1334). Each interlace may include a plurality of non-contiguous RBs of the shared spectrum. In some cases, the number of allocated interlaces may be unsupported by the joint interlace precoding hardware 1336 of the unlicensed spectrum transmitter module 1334. In some cases, the number of allocated interlaces may be seven.

In some examples, the allocated interlace partitioning module 1340 may be used to partition the allocated interlaces received by the allocated interlace reception module 1335 into at least two subsets of interlaces, such that a size of each subset of interlaces is supported by the joint interlace precoding hardware 1336 of the unlicensed spectrum transmitter module 1334. The size of each subset of interlaces may in some cases be selected based on a power metric (e.g., PAPR or CM) associated with a combination of the selected sizes for the apparatus 1315. For example, the size of each subset of interlaces may be selected to reduce a PAPR or CM associated with the combination of the selected sizes. In the case where seven allocated interlaces are received by the allocated interlace reception module 1335, the allocated interlace partitioning module 1340 may partition the allocated interlaces into a first set of one interlace and a second set of six interlaces.

In some examples, the joint interlace precoding hardware 1336 may be used to perform joint interlace precoding separately on each subset of interlaces defined by the allocated interlace partitioning module 1340. The precoded subsets of interlaces may then be transmitted over the shared spectrum, to a base station, by the unlicensed spectrum transmitter module 1334.

Figure 14:
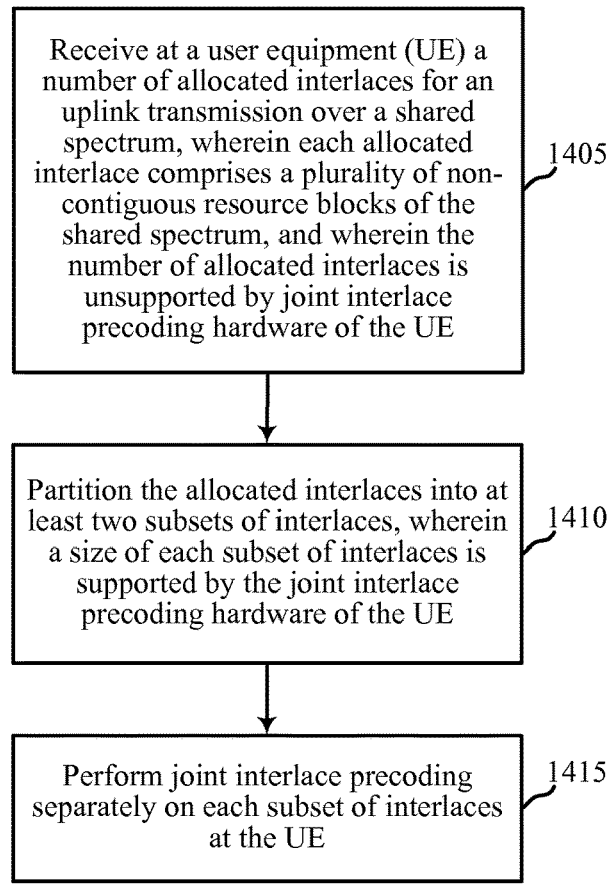
FIG. 14 is a flow chart illustrating an example of a method of wireless communication, in accordance with various aspects of the present disclosure.

FIG. 14 is a flow chart illustrating an example of a method 1400 of wireless communication, in accordance with various aspects of the present disclosure. For clarity, the method 1400 is described below with reference to aspects of one or more of the UEs 115 or 215 described with reference to FIG. 1, 2A, or 2B, or one of the apparatuses 315 or 1315 described with reference to FIG. 3 or 13. In some examples, a UE such as one of the UEs 115 or 215 or an apparatus such as one of the apparatuses 315 or 1315 may execute one or more sets of codes to control the functional elements of the UE or apparatus to perform the functions described below.

At block 1405, a number of allocated interlaces for an uplink transmission over a shared spectrum (e.g., an unlicensed spectrum in which LTE/LTE-A communications may be transmitted using the unlicensed spectrum transmitter module 1334) may be received at a UE. Each interlace may include a plurality of non-contiguous RBs of the shared spectrum. In some cases, the number of allocated interlaces may be unsupported by joint interlace precoding hardware of the UE. In some cases, the number of allocated interlaces may be seven. The operation(s) at block 1405 may be performed by the wireless communication management module 320 or 1320 described with reference to FIG. 3 or 13, or the allocated interlace reception module 1335 described with reference to FIG. 13.

At block 1410, the allocated interlaces may be partitioned into at least two subsets of interlaces, such that a size of each subset of interlaces is supported by the joint interlace precoding hardware of the UE. The size of each subset of interlaces may in some cases be selected based on a power metric (e.g., PAPR or CM) associated with a combination of the selected sizes for the UE. For example, the size of each subset of interlaces may be selected to reduce a PAPR or CM associated with the combination of the selected sizes. In the case where seven allocated interlaces are received at the UE, the allocated interlaces may be partitioned into a first set of one interlace and a second set of six interlaces. The operation(s) at block 1410 may be performed by the wireless communication management module 320 or 1320 described with reference to FIG. 3 or 13, or the allocated interlace partitioning module 1340 described with reference to FIG. 13.

At block 1415, joint interlace precoding may be performed separately on each subset of interlaces at the UE. The operation(s) at block 1415 may be performed by the wireless communication management module 320 or 1320 described with reference to FIG. 3 or 13, or the joint precoding hardware 1210 or 1336 described with reference to FIG. 12 or 13.

At block 1420, the precoded subsets of interlaces may be transmitted over the shared spectrum to a base station.

Thus, the method 1400 may provide for wireless communication. It should be noted that the method 1400 is just one implementation and that the operations of the method 1400 may be rearranged or otherwise modified such that other implementations are possible.

Figure 15:
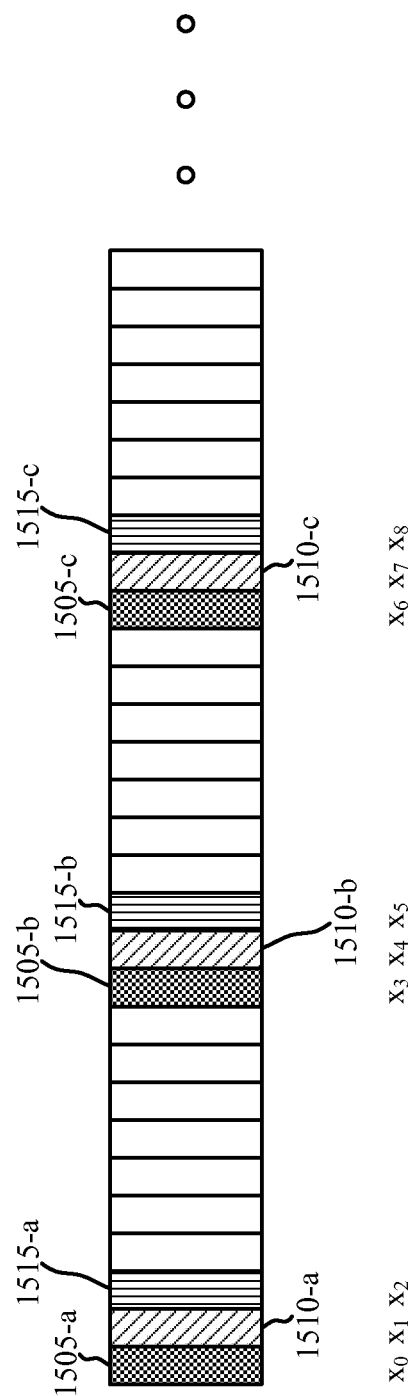
FIG. 15 illustrates an example of how a reference signal (e.g., a demodulation reference signal (DM-RS)) may be generated for each resource block of a number of allocated interlaces for an uplink transmission over a shared spectrum, in accordance with various aspects of the present disclosure.
Figure 16:
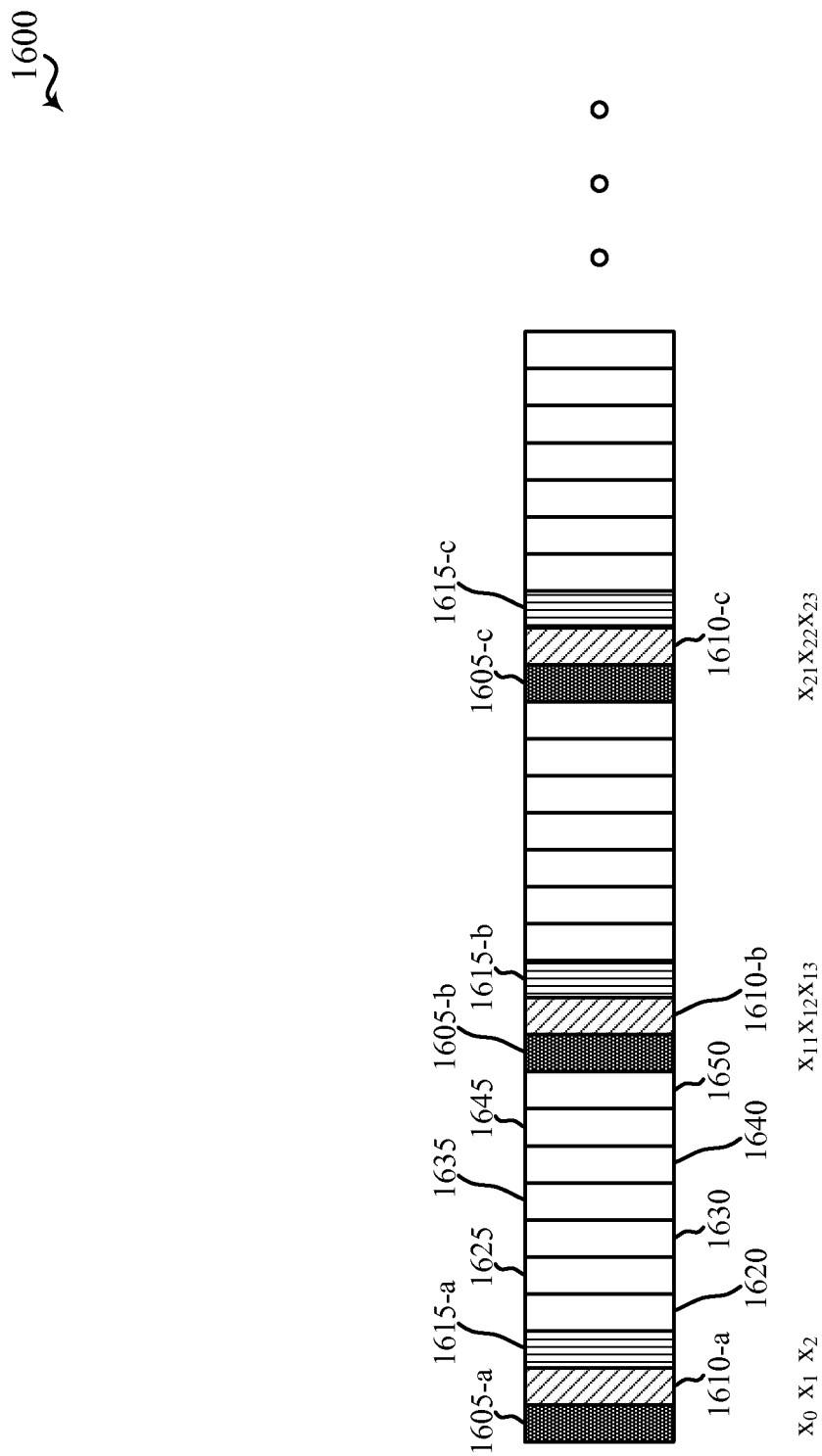
FIG. 16 illustrates another example of how a reference signal (e.g., a DM-RS) may be generated for each resource block (RB) of a number of allocated interlaces for an uplink transmission over a shared spectrum, in accordance with various aspects of the present disclosure.

FIGS. 15 & 16 illustrate examples of how a reference signal may be generated for each resource block of a number of allocated interlaces for an uplink transmission over a shared spectrum. More specifically, FIG. 15 illustrates an example 1500 of how a reference signal (e.g., a demodulation reference signal (DM-RS)) may be generated for each resource block of a number of allocated interlaces for an uplink transmission over a shared spectrum, in accordance with various aspects of the present disclosure. By way of example, FIG. 15 illustrates a portion of ten interlaces, of which three interlaces 1505, 1510, and 1515 out of the ten interlaces are allocated to a particular UE. Each of the blocks 1505-*a*, 1510-*a*, 1515-*a*, 1505-*b*, 1510-*b*, 1515-*b*, 1505-*c*, 1510-*c*, and 1515-*c* may represent a single RB including twelve frequency subcarriers, and each interlace 1505, 1510, and 1515 may include ten non-contiguous RBs (though only three RBs of each interlace are shown in FIG. 15). According to the example 1500, a reference signal sequence may be generated based solely on the allocated interlaces 1505, 1510, and 1515. Thus, for example, a reference signal sequence having 360 reference signal symbols may be generated (e.g., 10 RB/interlace×3 allocated interlaces×12 frequency subcarriers/RB). The reference signal symbols from the reference signal sequence may then be mapped to the RBs of the allocated interlaces according to frequency. In this manner, a reference signal (e.g., x1, x2, x3, x4, . . . ) generated for each RB (1505-*a*, 1510-*a*, 1515-*a*, 1505-*b*, . . . ) of the allocated interlaces may include the reference signal symbols mapped to that resource block.

FIG. 16 illustrates another example 1600 of how a reference signal (e.g., a DM-RS) may be generated for each RB of a number of allocated interlaces for an uplink transmission over a shared spectrum, in accordance with various aspects of the present disclosure. By way of example, FIG. 16 illustrates a portion of ten interlaces, of which three interlaces 1605, 1610, and 1615 out of the ten interlaces are allocated to a particular UE. Each of the blocks 1605-*a*, 1610-*a*, 1615-*a*, 1605-*b*, 1610-*b*, 1615-*b*, 1605-*c*, 1610-*c*, and 1615-*c* may represent a single RB including twelve frequency subcarriers, and each interlace 1605, 1610, and 1615 may include ten non-contiguous RBs (though only three RBs of each interlace are shown in FIG. 16). According to the example 1600, a reference signal sequence may be generated based on the allocated interlaces 1605, 1610, and 1615 as well as the unallocated interlaces 1620, 1625, 1630, 1635, 1640, 1645, and 1650. Thus, for example, a reference signal sequence having 1200 reference signal symbols may be generated (e.g., 10 RB/interlace×10 interlaces×12 frequency subcarriers/RB). The reference signal symbols from the reference signal sequence may then be mapped to the RBs of both the allocated interlaces and the unallocated interlaces according to frequency. In this manner, the reference signal sequence may be punctured when mapping reference signal symbols to the allocated interlaces 1605, 1610, and 1615. A reference signal (e.g., $x_1$, $x_2$, $x_3$, $x_{11}$, ... ) generated for each respective RB (1605-a, 1610-a, 1615-a, 1605-b, ... ) of the allocated interlaces may include the reference signal symbols mapped to that resource block.

In some cases, a number of computer generated sequences (CGS) are generated and may be used as reference signals (e.g., DM-RS). The number of CGSs may be predetermined, such as a factor, in some cases ten, times the number of allocated interlaces or based on implementation factors. For example, a UE with three allocated interlaces may be associated with thirty CGSs. The CGSs may be optimized for low circular cross correlation, and in some cases are used for physical uplink control channel (PUCCH) estimation. In some cases, the CGSs are of length twelve, such as to correspond with twelve frequency subcarriers of each RB, though the CGSs may be of any length appropriate for the specific implementation. In some examples, the CGSs are allocated, such as randomly or systematically, to RBs of the allocated interlaces. In the current example, the UE with three allocated interlaces may allocate one of 30 length 12 sequences to each active RB in each interlace. It should be noted that there is a chance that UEs of different neighboring base stations pick the same CGS in a given RB, which may result in poor channel estimates at the base station. In order to avoid this, more CGSs may be generated. In some cases, a random cyclic shift may be added on top of each CGS to reduce interference in case of a collision.

In some examples, reference signals (e.g., DM-RS) may be a combination of CGSs and Zadoff-Chu (ZC) sequences. For example, a reference signal sequence may consist of an inner CGS and an outer ZC sequence. The inner sequence may be a randomly chosen CGS and may be common to all the RBs in an interlace. The outer sequence may be the length of the number of RBs in an interlace, such as ten. At times, the outer sequence is generated with a root that is relatively prime to the length, such as three, seven, or nine if the length is ten. Interlaces allocated to the same UE may contain the same outer ZC sequence. The outer ZC sequence may differ between UEs. The reference signal for an interlace may be a Kronecker product of the outer ZC sequence and the inner CGS. In some cases, this reference signal has good circular auto-correlation.

Figure 17:
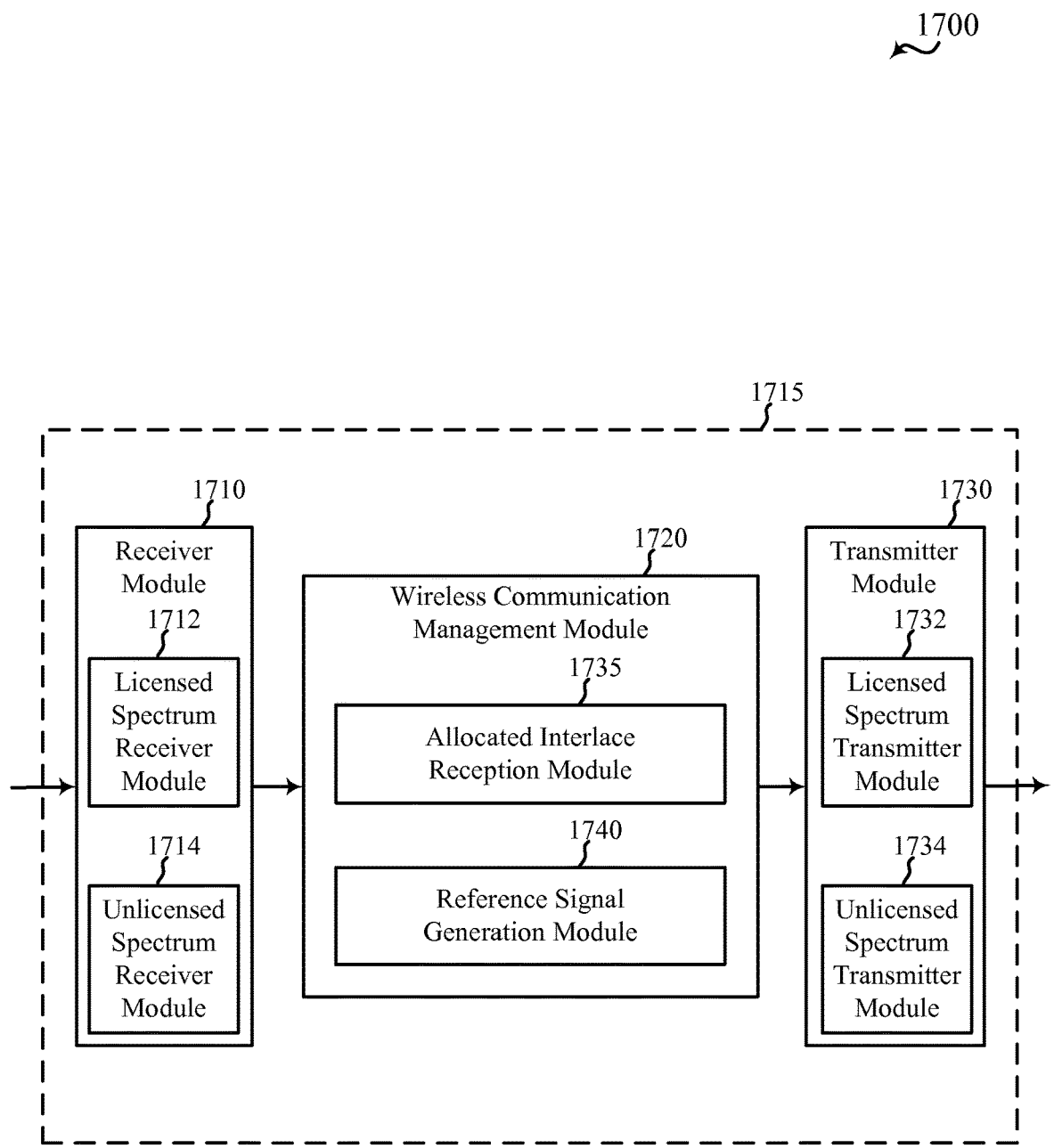
FIG. 17 shows a block diagram of an apparatus for use in wireless communication, in accordance with various aspects of the present disclosure.

FIG. 17 shows a block diagram 1700 of an apparatus 1715 for use in wireless communication, in accordance with various aspects of the present disclosure. In some examples, the apparatus 1715 may be an example of one or more aspects of one of the UEs 115 or 215 described with reference to FIG. 1, 2A, or 2B, or the apparatus 315, 615, 715, or 1315 described with reference to FIG. 3, 6, 7, or 13. The apparatus 1715 may also be a processor. The apparatus 1715 may include a receiver module 1710, a wireless communication management module 1720, or a transmitter module 1730. Each of these components may be in communication with each other.

The components of the apparatus 1715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1710 may be or include a radio frequency (RF) receiver, such as an RF receiver operable to receive transmissions in a first spectrum (e.g., an LTE/LTE-A licensed spectrum) or a second spectrum (e.g., an LTE/LTE-A unlicensed spectrum, which unlicensed spectrum may be shared with one or more apparatuses operating under the same or different transmission protocols, and which unlicensed spectrum may include WiFi spectrum). The RF receiver may include separate receivers for the first spectrum and the second spectrum. The separate receivers may in some cases take the form of a licensed spectrum receiver module 1712 for communicating over the first spectrum, and an unlicensed spectrum receiver module 1714 for communicating over the second spectrum. The receiver module 1710, including the licensed spectrum receiver module 1712 or the unlicensed spectrum receiver module 1714, may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 1730 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1732 for communicating over the first spectrum, and an unlicensed spectrum transmitter module 1734 for communicating over the second spectrum. The transmitter module 1730, including the licensed spectrum transmitter module 1732 or the unlicensed spectrum transmitter module 1734, may be used to transmit various types of data or control signals (i.e., transmissions) over one or more communication links of the wireless communications system including the first spectrum and the second spectrum.

In some examples, the wireless communication management module 1720 may be an example of one or more aspects of the wireless communication management module 320, 620, 720, or 1320 described with reference to FIG. 3, 6, 7, or 13 and may include an allocated interlace reception module 1735 or a reference signal generation module 1740. Each of these components may be in communication with each other.

In some examples, the allocated interlace reception module 1735 may be used to receive a number of allocated interlaces for an uplink transmission over a shared spectrum (e.g., an unlicensed spectrum in which LTE/LTE-A communications may be transmitted). Each interlace may include a plurality of non-contiguous RBs of the shared spectrum.

In some examples, the reference signal generation module 1740 may be used to generate a reference signal (e.g., a DM-RS) for each RB of the allocated interlaces according to a reference signal sequence based on an ordering of the RBs for the allocated interlaces within the shared spectrum.

In some cases, the reference signal generation module 1740 may generate the reference signals for the RBs by mapping reference signal symbols from the reference signal sequence to the RBs of the allocated interlaces within the shared spectrum according to frequency, such that the reference signal generated for each RB of the allocated interlaces includes the reference signal symbols mapped to that RB, as described, for example, with reference to FIG. 15.

In other cases, the shared spectrum may include a plurality of RBs associated with at least one unallocated interlace, and the reference signal generation module 1740 may generate the reference signals for the RBs by mapping reference signal symbols from the reference signal sequence to the RBs of the allocated interlaces and the at least one unallocated interlace according to frequency, and by puncturing the reference signal sequence to determine a subset of reference signal symbols mapped to the RBs of the allocated interlaces, such that the reference signal generated for each RB of the allocated interlaces includes the reference signal symbol mapped to that RB, as described, for example, with reference to FIG. 16.

Figure 18:
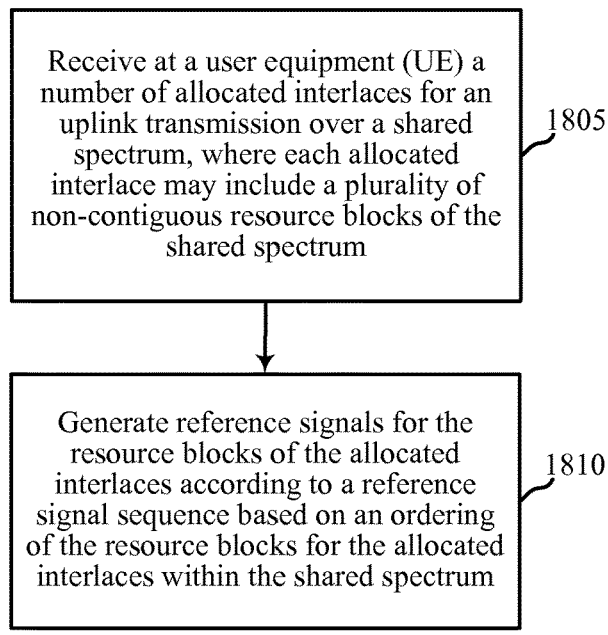
FIG. 18 is a flow chart illustrating an example of a method of wireless communication, in accordance with various aspects of the present disclosure.

FIG. 18 is a flow chart illustrating an example of a method 1800 of wireless communication, in accordance with various aspects of the present disclosure. For clarity, the method 1800 is described below with reference to aspects of one or more of the UEs 115 or 215 described with reference to FIG. 1, 2A, or 2B, or one of the apparatuses 315 or 1715 described with reference to FIG. 3 or 17. In some examples, a UE such as one of the UEs 115 or 215 or an apparatus such as one of the apparatuses 315 or 1715 may execute one or more sets of codes to control the functional elements of the UE or apparatus to perform the functions described below.

At block 1805, a number of allocated interlaces for an uplink transmission over a shared spectrum (e.g., an unlicensed spectrum in which LTE/LTE-A communications may be transmitted) may be received at a UE. Each allocated interlace may include a plurality of non-contiguous RBs of the shared spectrum. The operation(s) at block 1805 may be performed by the wireless communication management module 320 or 1720 described with reference to FIG. 3 or 17, or the allocated interlace reception module 1735 described with reference to FIG. 17.

At block 1810, a reference signal (e.g., a DM-RS) may be generated for each RB of the allocated interlaces according to a reference signal sequence based on an ordering of the RBs for the allocated interlaces within the shared spectrum. The operation(s) at block 1810 may be performed by the wireless communication management module 320 or 1720 described with reference to FIG. 3 or 17, or the reference signal generation module 1740 described with reference to FIG. 17.

In some examples, generating the reference signals for the RBs may include mapping reference signal symbols from the reference signal sequence to the RBs of the allocated interlaces within the shared spectrum according to frequency, such that the reference signal generated for each RB of the allocated interlaces includes the reference signal symbols mapped to that RB, as described, for example, with reference to FIG. 15.

In other examples, the shared spectrum may include a plurality of RBs associated with at least one unallocated interlace, and generating the reference signals for the RBs may include mapping reference signal symbols from the reference signal sequence to the RBs of the allocated interlaces and the at least one unallocated interlace according to frequency, and puncturing the reference signal sequence to determine a subset of reference signal symbols mapped to the RBs of the allocated interlaces, such that the reference signal generated for each RB of the allocated interlaces includes the reference signal symbol mapped to that RB, as described, for example, with reference to FIG. 16.

Thus, the method 1800 may provide for wireless communication. It should be noted that the method 1800 is just one implementation and that the operations of the method 1800 may be rearranged or otherwise modified such that other implementations are possible.

Figure 19:
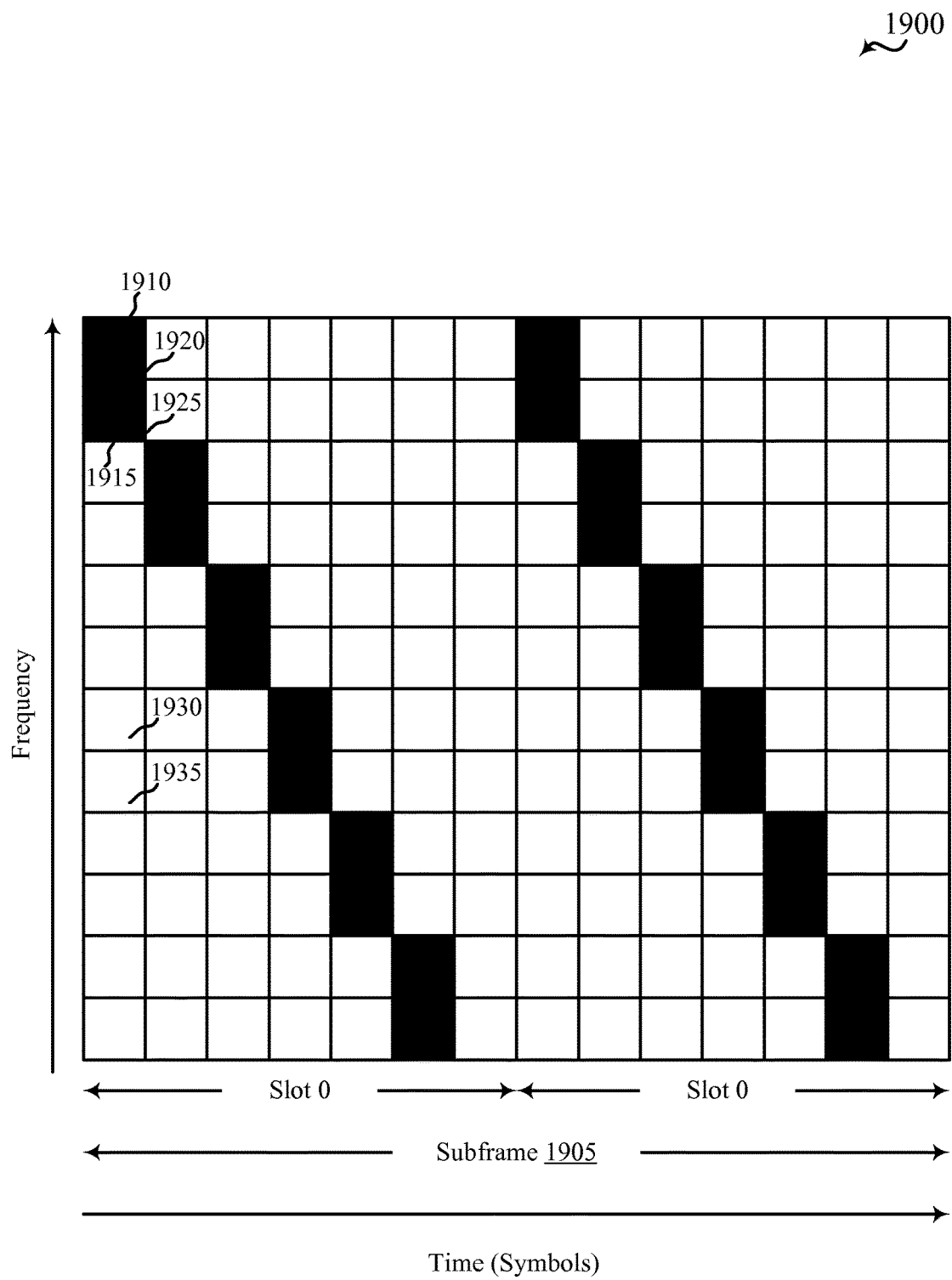
FIG. 19 illustrates an example of how a plurality of resource elements positions in a subframe may be mapped to a plurality of DM-RS transmissions over a shared spectrum, in accordance with various aspects of the present disclosure.

FIG. 19 illustrates an example 1900 of how a plurality of resource elements positions (e.g., resource element positions 1910, 1915, etc.) in a subframe 1905 may be mapped to a plurality of DM-RS transmissions (e.g., DM-RS transmissions 1920, 1925, etc.) over a shared spectrum, in accordance with various aspects of the present disclosure. More specifically, FIG. 19 illustrates how at least one of the DM-RS transmissions may be multiplexed with at least one data transmission during at least one FDMA symbol of the subframe 1905. Even more specifically, FIG. 19 illustrates how two DM-RS transmissions 1920 and 1925 may be 1) distributed in a resource element group including multiple (e.g., two) contiguous ones of the resource element positions, and 2) multiplexed with data transmissions in resource element positions such as resource element positions 1930 and 1935. By way of example, the resource element group includes resource element positions 1910 and 1915 belonging to different frequency subcarriers. Other DM-RS transmissions may be distributed in other resource element groups. Alternately, one or more (and even all) of the DM-RS transmissions may be transmitted apart from any resource element group. As shown, the DM-RS transmissions may be distributed across most all of the FDMA symbols of the subframe 1905 (e.g., all but two FDMA symbols).

In some cases, a DM-RS generated as described with reference to FIG. 15 may be mapped to a plurality of resource element positions as described with reference to FIG. 19. In other cases, a DM-RS generated as described with reference to FIG. 16 may be mapped to a plurality of resource element positions as described with reference to FIG. 19.

When a plurality of resource element positions in a subframe are mapped to a plurality of DM-RS transmissions as described with reference to FIG. 19, PAPR may not be a strong function of the choice of DM-RS sequence. In addition, the mapping described with reference to FIG. 19 may be a better mapping for estimating bursty interference, as it spans most of the FDMA symbols of a subframe. However, PAPR may be slightly higher (statistically) than when DM-RS transmissions are not multiplexed with data transmissions (e.g., because precoded symbols are mixed with DM-RS transmissions).

Figure 20:
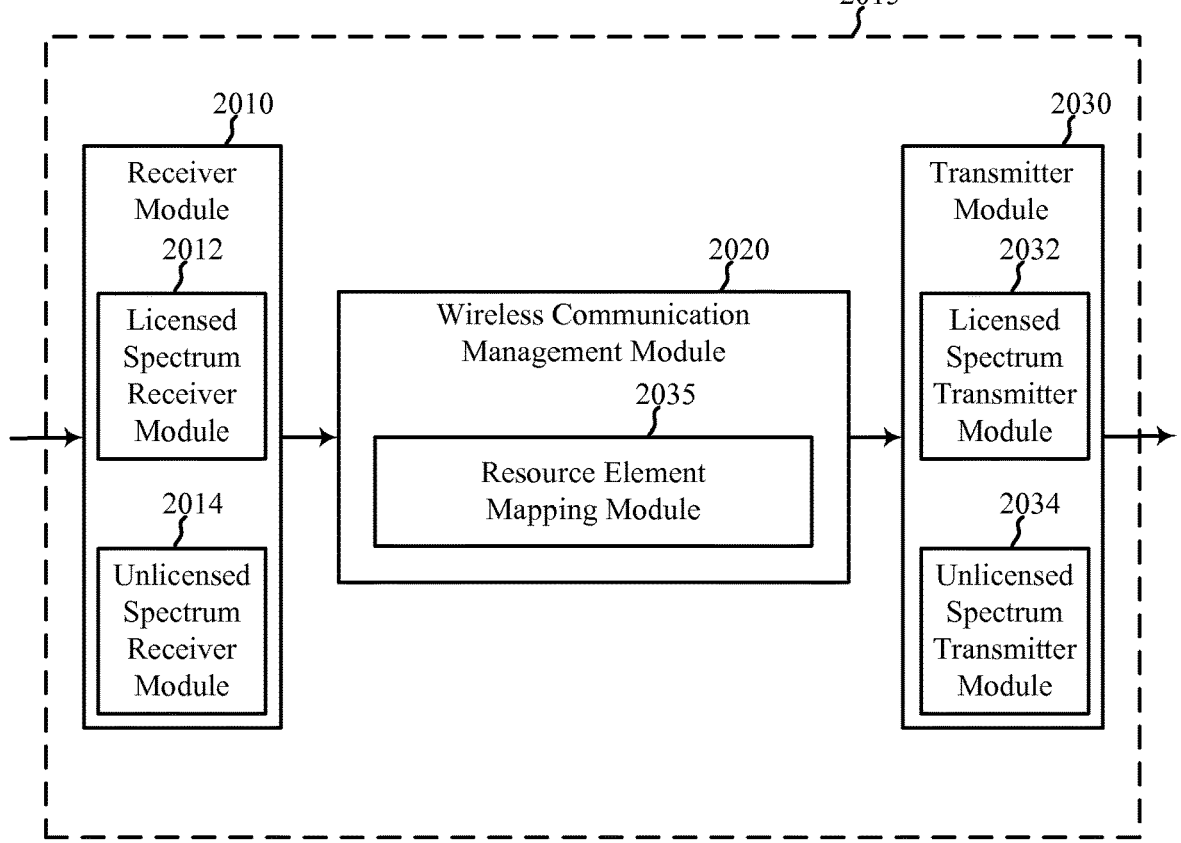
FIG. 20 shows a block diagram of an apparatus for use in wireless communication, in accordance with various aspects of the present disclosure.

FIG. 20 shows a block diagram 2000 of an apparatus 2015 for use in wireless communication, in accordance with various aspects of the present disclosure. In some examples, the apparatus 2015 may be an example of one or more aspects of one of the UEs 115 or 215 described with reference to FIG. 1, 2A, or 2B, or the apparatus 315, 615, 715, 1315, or 1715 described with reference to FIG. 3, 6, 7, 13, or 17. The apparatus 2015 may also be a processor. The apparatus 2015 may include a receiver module 2010, a wireless communication management module 2020, or a transmitter module 2030. Each of these components may be in communication with each other.

The components of the apparatus 2015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2010 may be or include a radio frequency (RF) receiver, such as an RF receiver operable to receive transmissions in a first spectrum (e.g., an LTE/LTE-A licensed spectrum) or a second spectrum (e.g., an LTE/LTE-A unlicensed spectrum, which unlicensed spectrum may be shared with one or more apparatuses operating under the same or different transmission protocols, and which unlicensed spectrum may include WiFi spectrum). The RF receiver may include separate receivers for the first spectrum and the second spectrum. The separate receivers may in some cases take the form of a licensed spectrum receiver module 2012 for communicating over the first spectrum, and an unlicensed spectrum receiver module 2014 for communicating over the second spectrum. The receiver module 2010, including the licensed spectrum receiver module 2012 or the unlicensed spectrum receiver module 2014, may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 2030 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 2032 for communicating over the first spectrum, and an unlicensed spectrum transmitter module 2034 for communicating over the second spectrum. The transmitter module 2030, including the licensed spectrum transmitter module 2032 or the unlicensed spectrum transmitter module 2034, may be used to transmit various types of data or control signals (i.e., transmissions) over one or more communication links of the wireless communications system including the first spectrum and the second spectrum.

In some examples, the wireless communication management module 2020 may be an example of one or more aspects of the wireless communication management module 320, 620, 720, 1320, or 2020 described with reference to FIG. 3, 6, 7, 13, or 20 and may include a resource element mapping module 2035.

In some examples, the resource element mapping module 2035 may be used to map a plurality of resource element positions in a subframe (e.g., an uplink subframe) to a plurality of DM-RS transmissions over the second spectrum, where at least one of the DM-RS transmissions may be multiplexed with at least one data transmission during at least one FDMA symbol (e.g., an SC-FDMA symbol) of the subframe, as described, for example, with reference to FIG. 19.

In some cases, the resource element mapping module 2035 may distribute the plurality of DM-RS transmissions across a plurality of FDMA symbols (e.g., all but two of the FDMA symbols) of the subframe.

In some cases, the resource element mapping module 2035 may distribute the plurality of DM-RS transmissions in a plurality of resource element groups, with each resource element group including multiple contiguous ones of the resource element positions (e.g., multiple contiguous resource elements in the time domain or the frequency domain).

In some cases, the resource element mapping module 2035 may map at least one DM-RS transmission to each of a plurality of frequency subcarriers of the subframe.

The unlicensed spectrum transmitter module 2034 may be used to transmit the DM-RS transmissions over the second spectrum according to the mapped resource element positions in the subframe.

Figure 21:
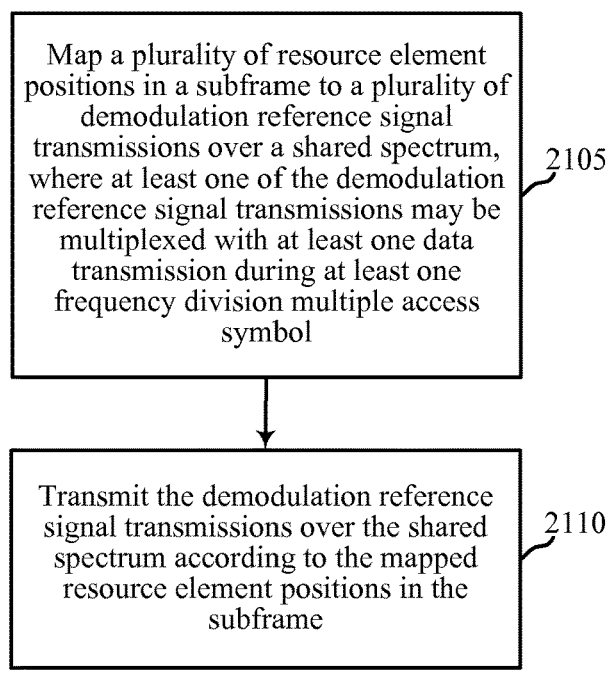
FIG. 21 is a flow chart illustrating an example of a method of wireless communication, in accordance with various aspects of the present disclosure.

FIG. 21 is a flow chart illustrating an example of a method 2100 of wireless communication, in accordance with various aspects of the present disclosure. For clarity, the method 2100 is described below with reference to aspects of one or more of the UEs 115 or 215 described with reference to FIG. 1, 2A, or 2B, or one of the apparatuses 315 or 2015 described with reference to FIG. 3 or 20. In some examples, a UE such as one of the UEs 115 or 215 or an apparatus such as one of the apparatuses 315 or 2015 may execute one or more sets of codes to control the functional elements of the UE or apparatus to perform the functions described below.

At block 2105, a plurality of resource element positions in a subframe (e.g., an uplink subframe) may be mapped to a plurality of DM-RS transmissions over a shared spectrum (e.g., an unlicensed spectrum in which LTE/LTE-A communications may be transmitted), where at least one of the DM-RS transmissions may be multiplexed with at least one data transmission during at least one FDMA symbol (e.g., an SC-FDMA symbol) of the subframe, as described, for example, with reference to FIG. 19. The operation(s) at block 2105 may be performed by the wireless communication management module 320 or 2020 described with reference to FIG. 3 or 20, or the resource element mapping module 2035 described with reference to FIG. 20.

In some cases, the plurality of DM-RS transmissions may be distributed across a plurality of FDMA symbols (e.g., all but two of the FDMA symbols) of the subframe.

In some cases, the plurality of DM-RS transmissions may be distributed in a plurality of resource element groups, with each resource element group including multiple contiguous ones of the resource element positions (e.g., multiple contiguous resource elements in the time domain or the frequency domain).

In some cases, at least one DM-RS transmission may be mapped to each of a plurality of frequency subcarriers of the subframe.

At block 2110, the DM-RS transmissions may be transmitted over the unlicensed spectrum according to the mapped resource element positions in the subframe. The operation(s) at block 2110 may be performed by the transmitter module 330 or 2030 described with reference to FIG. 3 or 20, or the unlicensed spectrum transmitter module 2034 described with reference to FIG. 20.

Thus, the method 2100 may provide for wireless communication. It should be noted that the method 2100 is just one implementation and that the operations of the method 2100 may be rearranged or otherwise modified such that other implementations are possible.

In some examples, one or more aspects of the methods 800, 900, 1000, 1100, 1400, 1800, or 2100 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. By way of further example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   receiving at a user equipment (UE) a number of interlaces allocated to the UE on a per-UE basis for an uplink transmission over a contention based shared spectrum, wherein each allocated interlace comprises a plurality of resource blocks of the contention based shared spectrum in a carrier of a frequency domain, wherein each resource block of the plurality of resource blocks of each interlace is non-contiguous with a remainder of the plurality of resource blocks of that interlace; and
   generating reference signals for resource blocks of the allocated interlaces according to a reference signal sequence based at least in part on an ordering of the resource blocks of the allocated interlaces within the contention based shared spectrum in the carrier of the frequency domain, wherein the ordering of the resource blocks comprises at least a lower-ordered resource block and a higher-ordered resource block, wherein a single reference signal is generated for at least one interlace of the allocated interlaces, the at least one interlace comprising a plurality of the resource blocks that are each non-contiguous, wherein the single reference signal is mapped to the plurality of the resource blocks, and wherein the mapping comprises mapping the lower-ordered resource block before mapping the higher-ordered resource block.

2. The method of claim 1, wherein generating the reference signals comprises:
   mapping reference signal symbols from the reference signal sequence to the resource blocks of the allocated interlaces within the contention based shared spectrum according to frequency.

3. The method of claim 1, wherein the contention based shared spectrum comprises a plurality of resource blocks associated with at least one unallocated interlace, wherein generating the reference signals comprises:
   mapping reference signal symbols from the reference signal sequence to the resource blocks of the allocated interlaces and the at least one unallocated interlace according to frequency; and
   puncturing the reference signal sequence to determine a subset of reference signal symbols mapped to the resource blocks of the allocated interlaces;

wherein a separate reference signal is generated for each of the resource blocks of the allocated interlaces based at least in part on the reference signal symbols mapped to that resource block.

4. The method of claim 1, wherein generating the reference signals comprises:
generating a number of computer generated sequences; and
mapping one of the computer generated sequences to one of the resource blocks of the allocated interlaces within the contention based shared spectrum.

5. The method of claim 4, wherein a length of the computer generated sequences is based at least in part on a number of frequency subcarriers for the resource blocks.

6. The method of claim 4, wherein the number of computer generated sequences is based at least in part on the number of allocated interlaces.

7. The method of claim 4, further comprising:
shifting at least one of the computer generated sequences based at least in part on a random cyclic shift.

8. The method of claim 4, wherein mapping one of the computer generated sequences to one of the resource blocks comprises:
generating an outer sequence;
determining a number of combined sequences, wherein the combined sequences are based at least in part on at least one of the computer generated sequences and the outer sequence; and
mapping one of the combined sequences to one of the resource blocks of the allocated interlaces within the contention based shared spectrum.

9. The method of claim 1, further comprising:
transmitting the uplink transmission over the contention based shared spectrum, wherein the uplink transmission comprises at least one of the allocated interlaces.

10. The method of claim 1, wherein a separate reference signal is generated for each of the resource blocks of the allocated interlaces based at least in part on the reference signal symbols mapped to that resource block.

11. An apparatus for wireless communication, comprising:
a processor; and
memory coupled to the processor, wherein the processor is configured to:
receive at a user equipment (UE) a number of interlaces allocated to the UE on a per-UE basis for an uplink transmission over a contention based shared spectrum, wherein each allocated interlace comprises a plurality of resource blocks of the contention based shared spectrum in a carrier of a frequency domain, wherein each resource block of the plurality of resource blocks of each interlace is non-contiguous with a remainder of the plurality of resource blocks of that interlace; and
generate reference signals for resource blocks of the allocated interlaces according to a reference signal sequence based at least in part on an ordering of the resource blocks for the allocated interlaces within the contention based shared spectrum in the carrier of the frequency domain, wherein the ordering of the resource blocks comprises at least a lower-ordered resource block and a higher-ordered resource block, wherein a single reference signal is generated for at least one interlace of the allocated interlaces, the at least one interlace comprising a plurality of the resource blocks that are each non-contiguous, and wherein the single reference signal is mapped to the plurality of the resource blocks, and wherein the mapping comprises mapping the lower-ordered resource block before mapping the higher-ordered resource block.

12. The apparatus of claim 11, wherein the processor is further configured to:
map reference signal symbols from the reference signal sequence to the resource blocks of the allocated interlaces within the contention based shared spectrum according to frequency;
wherein a separate reference signal is generated for each of the resource blocks of the allocated interlaces based at least in part on the reference signal symbols mapped to that resource block.

13. The apparatus of claim 11, wherein the contention based shared spectrum comprises a plurality of resource blocks associated with at least one unallocated interlace, and wherein the processor is configured to generate the reference signals by:
mapping reference signal symbols from the reference signal sequence to the resource blocks of the allocated interlaces and the at least one unallocated interlace according to frequency; and
puncturing the reference signal sequence to determine a subset of reference signal symbols mapped to the resource blocks of the allocated interlaces;
wherein a separate reference signal is generated for each of the resource blocks of the allocated interlaces based at least in part on the reference signal symbols mapped to that resource block.

14. The apparatus of claim 11, wherein the processor is configured to generate the reference signals by:
generating a number of computer generated sequences; and
mapping one of the computer generated sequences to one of the resource blocks of the allocated interlaces within the contention based shared spectrum.

15. The apparatus of claim 14, wherein a length of the computer generated sequences is based at least in part on a number of frequency subcarriers for the resource blocks.

16. The apparatus of claim 14, wherein the number of computer generated sequences is based at least in part on the number of allocated interlaces.

17. The apparatus of claim 14, wherein the processor is further configured to:
shift at least one of the computer generated sequences based at least in part on a random cyclic shift.

18. The apparatus of claim 14, wherein the processor is configured to map one of the computer generated sequences to one of the resource blocks by:
generating an outer sequence;
determining a number of combined sequences, wherein the combined sequences are based at least in part on at least one of the computer generated sequences and the outer sequence; and
mapping one of the combined sequences to one of the resource blocks of the allocated interlaces within the contention based shared spectrum.

19. The apparatus of claim 11, wherein the processor is further configured to:
transmit the uplink transmission over the computer generated shared spectrum, wherein the uplink transmission comprises at least one of the allocated interlaces.

20. A method of wireless communication, comprising:
receiving at a user equipment (UE) a number of interlaces allocated to the UE on a per-UE basis for an uplink transmission over a contention based shared spectrum, wherein each allocated interlace comprises a plurality of non-contiguous resource blocks of the contention based shared spectrum in a carrier of a frequency domain; and generating reference signals for the resource blocks of the allocated interlaces according to a reference signal sequence based at least in part on an ordering of the resource blocks for the allocated interlaces within the contention based shared spectrum in the carrier of the frequency domain, wherein the ordering of the resource blocks comprises at least a lower-ordered resource block and a higher-ordered resource block, wherein generating the reference signals comprises mapping reference signal symbols from the reference signal sequence to the resource blocks of the allocated interlaces within the contention based shared spectrum according to frequency, and wherein the mapping comprises mapping the lower-ordered resource block before mapping the higher-ordered resource block.

21. The method of claim 20, wherein the contention based shared spectrum comprises a plurality of resource blocks associated with at least one unallocated interlace, wherein the mapping further comprises mapping at least one unallocated interlace according to frequency; and the generating the reference signals further comprises puncturing the reference signal sequence to determine a subset of reference signal symbols mapped to the resource blocks of the allocated interlaces, wherein a separate reference signal is generated for each of the resource blocks of the allocated interlaces based at least in part on the reference signal symbols mapped to that resource block.

22. The method of claim 20, wherein generating the reference signals comprises:

generating a number of computer generated sequences; and the mapping further comprises mapping one of the computer generated sequences to one of the resource blocks of the allocated interlaces within the contention based shared spectrum.

23. The method of claim 22, wherein a length of the computer generated sequences is based at least in part on a number of frequency subcarriers for the resource blocks.

24. The method of claim 22, wherein the number of computer generated sequences is based at least in part on the number of allocated interlaces.

25. The method of claim 22, further comprising:

shifting at least one of the computer generated sequences based at least in part on a random cyclic shift.

26. The method of claim 22, wherein the mapping one of the computer generated sequences to one of the resource blocks comprises:

generating an outer sequence;

determining a number of combined sequences, wherein the combined sequences are based at least in part on at least one of the computer generated sequences and the outer sequence; and mapping one of the combined sequences to one of the resource blocks of the allocated interlaces within the contention based shared spectrum.

27. The method of claim 20, further comprising:

transmitting the uplink transmission over the contention based shared spectrum, wherein the uplink transmission comprises at least one of the allocated interlaces.

28. An apparatus for wireless communication, comprising:

a processor; and memory coupled to the processor, wherein the processor is configured to:

receive at a user equipment (UE) a number of interlaces allocated to the UE on a per-UE basis for an uplink transmission over a contention based shared spectrum, wherein each allocated interlace comprises a plurality of non-contiguous resource blocks of the contention based shared spectrum in a carrier of a frequency domain; and generate reference signals for the resource blocks of the allocated interlaces according to a reference signal sequence based at least in part on an ordering of the resource blocks for the allocated interlaces within the contention based shared spectrum in the carrier of the frequency domain, wherein the ordering of the resource blocks comprises at least a lower-ordered resource block and a higher-ordered resource block, map reference signal symbols from the reference signal sequence to the resource blocks of the allocated interlaces within the contention based shared spectrum according to frequency, and wherein the mapping comprises mapping the lower-ordered resource block before mapping the higher-ordered resource block.

29. The apparatus of claim 28, wherein the contention based shared spectrum comprises a plurality of resource blocks associated with at least one unallocated interlace, and wherein the processor is configured to generate the reference signals by:

mapping reference signal symbols from the reference signal sequence to the resource blocks of the allocated interlace and the at least one unallocated interlace according to frequency; and puncturing the reference signal sequence to determine a subset of reference signal symbols mapped to the resource blocks of the allocated interlaces;

wherein a separate reference signal is generated for each of the resource blocks of the allocated interlaces based at least in part on the reference signal symbols mapped to that resource block.

30. The apparatus of claim 28, and wherein the processor is configured to generate the reference signals by:

generating a number of computer generated sequences; and mapping one of the computer generated sequences to one of the resource blocks of the allocated interlaces within the contention based shared spectrum.

31. The apparatus of claim 30, wherein a length of the computer generated sequences is based at least in part on a number of frequency subcarriers for the resource blocks.

32. The apparatus of claim 30, wherein the number of computer generated sequences is based at least in part on the number of allocated interlaces.

33. The apparatus of claim 30, and wherein the processor is configured to:

shift at least one of the computer generated sequences based at least in part on a random cyclic shift.

34. The apparatus of claim 30, wherein the processor is configured to map one of the computer generated sequences to one of the resource blocks by:
- generating an outer sequence;
- determining a number of combined sequences, wherein the combined sequences are based at least in part on at least one of the computer generated sequences and the outer sequence; and
- mapping one of the combined sequences to one of the resource blocks of the allocated interlaces within the contention based shared spectrum.

35. The apparatus of claim 28, wherein the processor is configured to:
- transmit the uplink transmission over the contention based shared spectrum, wherein the uplink transmission comprises at least one of the allocated interlaces.

* * * * *